(12) United States Patent
Nakajima

(10) Patent No.: US 7,571,117 B1
(45) Date of Patent: *Aug. 4, 2009

(54) ELECTRONIC AUTHENTICATION SYSTEM, AUTHENTICATION APPARATUS, AND TERMINAL

(75) Inventor: Keiichi Nakajima, Tokyo (JP)

(73) Assignee: SoftbankBB Corporation, Tokyo (JP)

( * ) Notice: Subject to any disclaimer, the term of this patent is extended or adjusted under 35 U.S.C. 154(b) by 326 days.

This patent is subject to a terminal disclaimer.

(21) Appl. No.: 09/630,563

(22) Filed: Aug. 2, 2000

Related U.S. Application Data

(63) Continuation of application No. PCT/JP00/02015, filed on Mar. 29, 2000, and a continuation of application No. PCT/JP99/04178, filed on Aug. 2, 1999.

(51) Int. Cl.
*G06Q 30/00* (2006.01)
(52) U.S. Cl. .......................................... 705/26; 705/27
(58) Field of Classification Search ............. 705/26–27, 705/40–44, 35–39
See application file for complete search history.

(56) References Cited

U.S. PATENT DOCUMENTS

| | | | |
|---|---|---|---|
| 4,742,351 A | 5/1988 | Suzuki | |
| 5,267,314 A | 11/1993 | Stambler | |
| 5,321,242 A | 6/1994 | Heath | |
| 5,590,199 A | 12/1996 | Krajewski et al. | |
| 5,591,949 A | 1/1997 | Bernstein | |
| 5,604,802 A | 2/1997 | Holloway | |
| 5,608,778 A | 3/1997 | Partridge, III | 379/58 |
| 5,615,110 A | 3/1997 | Wong | |
| 5,708,422 A | 1/1998 | Blonder | |
| 5,715,314 A * | 2/1998 | Payne et al. | 705/78 |
| 5,724,424 A * | 3/1998 | Gifford | 705/79 |

(Continued)

FOREIGN PATENT DOCUMENTS

EP    0950968 A1    10/1999

(Continued)

OTHER PUBLICATIONS

Mobile Commerce: Geoff, Naim; "Mobile Commerce Vision Of 'An Internet With Wings,'" Financial Times, Jul. 1, 1998, Proquest #30857907.*

(Continued)

*Primary Examiner*—Robert M. Pond
(74) *Attorney, Agent, or Firm*—Stroock & Stroock & Lavan LLP

(57) ABSTRACT

A simple, easy, and safe electronic settlement system is provided. A user terminal such as a cellular phone is wirelessly connected to a synchronizing server. A cashier server of a mail order retailer activates a virtual cashier terminal, and connects to the synchronizing server. The synchronizing server sets a transaction identifying number in order to identify the transaction, and sends to the user terminal information about the cashier server and the transaction identifying number. A user confirms the cashier server, and returns the transaction identifying number to the synchronizing server. The synchronizing server completes a transaction between the virtual cashier terminal and the user terminal, both of which are corresponded to each other by the transaction identification number. The user can complete a settlement of mail order without telling his or her personal information such as a credit card number or a password to a mail order retailer. A security of the system is improved.

45 Claims, 27 Drawing Sheets

U.S. PATENT DOCUMENTS

| | | | |
|---|---|---|---|
| 5,745,886 A | 4/1998 | Rosen | |
| 5,826,241 A | 10/1998 | Stein | |
| 5,883,810 A * | 3/1999 | Franklin et al. | 700/232 |
| 5,889,863 A | 3/1999 | Weber | 380/25 |
| 5,890,137 A * | 3/1999 | Koreeda | 705/26 |
| 5,899,980 A * | 5/1999 | Wilf et al. | 705/26 |
| 5,903,878 A | 5/1999 | Talati et al. | |
| 5,914,472 A | 6/1999 | Foladore et al. | |
| 5,924,078 A * | 7/1999 | Naftzger | 705/16 |
| 5,974,146 A | 10/1999 | Randle et al. | |
| 5,986,565 A | 11/1999 | Isaka | |
| 5,988,497 A | 11/1999 | Wallace | |
| 5,991,749 A | 11/1999 | Morrill, Jr. | |
| 6,016,956 A | 1/2000 | Takami et al. | |
| 6,038,549 A | 3/2000 | Davis et al. | |
| 6,092,202 A | 7/2000 | Veil et al. | |
| 6,128,600 A | 10/2000 | Imamura et al. | |
| 6,178,409 B1 | 1/2001 | Weber et al. | 705/79 |
| 6,282,522 B1 | 8/2001 | Davis et al. | |
| 6,324,525 B1 | 11/2001 | Kramer et al. | 705/40 |
| 6,332,133 B1 * | 12/2001 | Takayama | 705/39 |
| 6,332,154 B2 * | 12/2001 | Beck et al. | 709/204 |
| 6,366,893 B2 | 4/2002 | Hannula et al. | |
| 6,405,176 B1 * | 6/2002 | Toohey | 705/26 |
| 6,453,301 B1 | 9/2002 | Niwa | |
| 6,488,203 B1 | 12/2002 | Stoutenburg et al. | |
| 6,629,135 B1 * | 9/2003 | Ross et al. | 709/218 |
| 6,754,640 B2 | 6/2004 | Bozeman | |
| 6,796,491 B2 | 9/2004 | Nakajima | |
| 6,970,852 B1 * | 11/2005 | Sendo et al. | 705/67 |
| 7,014,106 B2 | 3/2006 | Nakajima | |
| 7,296,755 B2 | 11/2007 | Nakajima | |
| 2002/0073046 A1 | 6/2002 | David | |
| 2004/0199474 A1 | 10/2004 | Ritter | |
| 2006/0253340 A1 | 11/2006 | Levchin et al. | |

FOREIGN PATENT DOCUMENTS

| | | |
|---|---|---|
| EP | 0 935 221 A2 | 11/1999 |
| JP | 62-15657 A | 1/1987 |
| JP | 62-191197 A | 8/1987 |
| JP | 8-16740 A | 1/1996 |
| JP | 8-96043 A | 4/1996 |
| JP | 9-116960 A | 5/1997 |
| JP | 10-91866 A | 4/1998 |
| JP | 10-207946 | 8/1998 |
| JP | 10-289267 A | 10/1998 |
| JP | 11-45366 A | 2/1999 |
| JP | 11-85014 A | 3/1999 |
| JP | 11-096252 | 4/1999 |
| JP | 11-224236 A | 8/1999 |
| JP | 11-511882 A | 10/1999 |
| WO | 96/36148 A1 | 11/1996 |
| WO | 96/36934 | 11/1996 |
| WO | 97/45814 | 12/1997 |
| WO | 97/49074 | 12/1997 |
| WO | WO97/49074 | 12/1997 |
| WO | 98/37524 A1 | 8/1998 |
| WO | 98/47116 A1 | 10/1998 |
| WO | 99/09502 | 2/1999 |
| WO | 99/66436 A1 | 12/1999 |
| WO | 00/49551 | 8/2000 |
| WO | WO 01/09808 A1 | 2/2001 |
| WO | 01/022342 | 3/2001 |

OTHER PUBLICATIONS

Mobile Commerce: McDonald, Malcom; "Smartcard Chip Reduces EFTPOS Security Risk-Tobin," Dominion, Mar. 30, 1998, Proquest #28386959.*

Dunlap, Charlotte; "Open Market Pact Invests In E-Commerce," Computer Reseller News, May 11, 1998, n788p. 103, Proquest #29397051.*

"Open Market Receives Patents For Core Internet Commerce Technology; Patents Cover Internet Marketing, Order Management and Payment," PR Newswire, Mar. 3, 1998, Proquest #26881564.*

Item UU: PRN: "Open Market Introduces Industry-Defining Software For Internet Commerce," PR Newswire, Feb. 17, 1998, Proquest #26408772.*

Item VV: Steinberg, Steve G.; "Smart Cards Finally Draw A Good Hand//Smart Card Technology Finally Draws A Good Hand//Smart Cards Play Into Net Security," Austin American Statesman, Dec. 29, 1997, Proquest #25116767.*

Item WW: Meyers, Jason; "Speak The Truth," Telephony, Sep. 29, 1997, v233n13p. 23, Proquest #16449380.*

PRN: "Geoworks first to deliver shopping discounts direct to mobile phone and pager users," PR Newswire, Jun. 22, 1999, Proquest #42565164, 4pgs.*

Gifford et al., "Payment Switches . . . Networks", 1995 IEEE, 26-31.

Microsoft Press Computer Dictionary, p. 456 (3d ed. 1997).

U.S. Appl. No. 60/131,369, filed Apr. 28, 1999, Sherman.

U.S. Appl. No. 09/630,557, filed Aug. 2, 2000, Nakajima.

U.S. Appl. No. 09/786,208, filed May 8, 2001, Nakajima.

U.S. Appl. No. 11/043,050, filed Jan. 27, 2005, Nakajima.

U.S. Appl. No. 11/344,131, filed Feb. 1, 2006, Nakajima.

Partial English translation of Office Action in JP appln. No. 2001-514352 (Oct. 23, 2007).

O'Mahony, D., et al. "Electronic Payment Systems", Artech House, pp. 62-63 (1997).

U.S. Appl. No. 60/131,785, filed Apr. 30, 1999 (including Exhibit A).

U.S. Appl. No. 60/144,633, filed Jul. 19, 1999 (including Exhibit A).

U.S. Appl. No. 60/172,311, filed Dec. 17, 1999 (including Exhibit A).

U.S. Appl. No. 60/146,628 (David).

U.S. Appl. No. 60/167,352 (David).

Office Action in U.S. Appl. No. 11/344,131 (mailing date Jul. 16, 2007).

English translation of International Preliminary Examination Report in International patent appln. PCT/JP00/02014 (Oct. 16, 2001).

Proceedings of the Third ACM Conference on Computer and Communications Security—Titled—"Payment Switches for Open Networks," authored by David K. Gifford et al. pp. 26-31, 1995 COMPCON.

Office Action from Japanese patent appln. 2001-514350 A (Feb. 17, 2009), with partial English translation.

* cited by examiner

○○MAIL ORDER JULY 2000  TRANSACTION ID : 997611

ITEM : BIBELOT OF BIRD
PRICE : ¥1,980
ITEM NUMBER
  BLUE : 54321
  RED : 54322
  YELLOW : 54323

ITEM : EXERCISE BYCICLE
PRICE : ¥56,000
ITEM NUMBER
  BLUE : 54331
  RED : 54332
  YELLOW : 54333

ITEM : BOOTS
PRICE : ¥32,000
ITEM NUMBER : 6123+
  23cm=23
  24cm=24
  25cm=26
  27cm=27

US 7,571,117 B1

ELECTRONIC AUTHENTICATION SYSTEM, AUTHENTICATION APPARATUS, AND TERMINAL

CROSS-REFERENCE TO RELATED APPLICATIONS

This application is a continuation application under 35 U.S.C. § 120 based on and claiming the benefit of International Application Serial No. PCT/JP99/04178 (U.S. Designated), filed on Aug. 2, 1999, and International Application Serial No. PCT/JP00/02015 (U.S. Designated), filed on Mar. 29, 2000.

BACKGROUND OF THE INVENTION

1. Field of the Invention

The present invention relates to an electronic settlement system, a settlement apparatus, and its terminal. In particular the present invention relates to an electronic settlement system and a settlement apparatus, which may perform a settlement of a commercial transaction electronically via a telecommunication network, and its terminal.

2. Description of the Related Art

Conventionally, in an electronic settlement system, which executes a settlement of a commercial transaction electronically via a communication network, personal data such as a credit card number is sent in the form of digital data such as a credit card number via the Internet. Sending personal data such as a credit card number directly, the credit card number may be stolen and suffer from a false use. Thus, it is necessary to keep personal data from being leaked by using a high level of cryptology. To improve security, the electronic settlement system needs a complex authenticating procedure however this sacrifices convenience.

Therefore, an object of the present invention is to solve such a problem and provide a safe and convenient electronic settlement system.

SUMMARY OF THE INVENTION

Therefore, it is an object of the present invention to provide an electronic settlement system, a settlement apparatus, and its terminal which overcomes the above issues in the related art. This object is achieved by combinations described in the independent claims. The dependent claims define further advantageous and exemplary combinations of the present invention.

According to the first aspect of the present invention, an electronic settlement system to settle a transaction using a telecommunication network, comprises a settlement apparatus which performs the settlement of the transaction; a billing terminal connecting to the settlement apparatus via the telecommunication network for performing billing of the transaction; and a paying terminal, connecting to the settlement apparatus via the telecommunication network for performing paying of the transaction, wherein: the settlement apparatus performs the settlement of transaction by synchronizing a communication to the billing terminal with a communication to the paying terminal when the settlement apparatus sets up a transaction identifying number which identifies the transaction and when the paying terminal transmits to the settlement apparatus the same transaction identifying number as the transaction identifying number.

The billing terminal may connect to the settlement apparatus via a commercial telephone line or a private line, and the paying terminal connects to the settlement apparatus via a radiotelephone communication.

According to the second aspect of the present invention, a settlement apparatus performing a settlement of a transaction, which communicates to a billing terminal performing billing of the transaction with to a paying terminal performing paying of the transaction, the apparatus comprises a first communication unit connecting to the billing terminal via a first telecommunication network; a second communication unit connecting to the paying terminal via second telecommunication network; and a processing unit for processing the settlement of transaction, the processing unit synchronizing a communication to the billing terminal with a communication to the paying terminal when the processing unit sets a transaction identifying number to identify the transaction, and when the paying terminal transmits to the settlement apparatus a transaction identifying number which is the same as the transaction identifying number.

The first communication unit may connect to the billing terminal via a commercial telephone line or a private line, and the second communication unit connects to the paying terminal via radiotelephone communication. The settlement apparatus may further comprises a billing terminal database which stores information about the billing terminal, wherein: the processing unit retrieves information about the billing terminal from the billing terminal database so that the billing terminal confirms the paying terminal, the second communication unit transmits to the paying terminal the information about the billing terminal in addition to the transaction identifying number for identifying the transaction, and when the paying terminal confirms the information about the billing terminal, and transmits the transaction identifying number to the settlement apparatus, the processing unit synchronizes the communication to the billing terminal with the communication to the paying terminal, and the first communication unit transmits a synchronization confirmation signal which indicates establishment of synchronization with the billing terminal.

The second communication unit may transmit to the paying terminal the information about the billing terminal and the transaction identifying number being attached to an internet link address, a user of the paying terminal accesses the link address so that the information about the billing terminal and the transaction identifying number are returned from the paying terminal, and the processing unit synchronizes the billing terminal identified by the information about the billing terminal with the communication to the paying terminal.

The processing unit may process the settlement of transaction between the billing terminal and the paying terminal, both of which are synchronized each other by the transaction identifying number. The first communication unit may receive a purchase amount of the transaction from the billing terminal, and the processing unit processes the settlement of transaction for a user of the paying terminal based on the purchase amount that the first communication unit receives from the billing terminal.

The first communication unit may receive a purchase amount of the transaction from the billing terminal, the second communication unit may transmit the purchase amount to the paying terminal so that the paying terminal confirms the purchase amount, and receives a final purchase confirmation signal to confirm purchase amount the from the paying terminal, the processing unit may perform a settlement processing after the second communication unit receives the final purchase confirmation signal from the paying terminal, the first communication unit may transmit a settlement completion notification, which notifies completion of the settlement processing performed by the processing unit to the billing terminal, and the second communication unit may transmit to the paying terminal a receipt which notifies the receiving of the purchasing amount of the settlement processing by the processing unit.

The settlement apparatus may further comprises a billing terminal database storing information about the billing terminal, wherein: the first communication unit receives an identifying number to identify the billing terminal from the billing terminal, and the processing unit retrieves information about the billing terminal from the billing terminal database and confirms a registration of the billing terminal, based on the identifying number. The second communication unit transmits to the paying terminal the information about the billing terminal, for the paying terminal to confirm the billing terminal, retrieved from the billing terminal database.

The settlement apparatus may further comprises a paying terminal database which stores information about the paying terminal, wherein the second communication unit detects a calling telephone number of the paying terminal, the processing unit retrieves information about a user of the paying terminal from the paying terminal database based on the calling telephone number, and the processing unit inquires at least one of a registration status of the user, a payment history of the user, and available amount of the user.

The processing unit may retrieve at least a part of attribute information of the user of the paying terminal from the paying terminal database, and the first communication unit transmits to the billing terminal at least a part of the attribute information of the user of the paying terminal. When the second communication unit receives a message which demands a purchase history of the user of the paying terminal, the processing unit may retrieve the purchase history of the user from the paying terminal database, and the second communication unit transmits the purchase history to the paying terminal.

The first communication unit may receive from the billing terminal an item ordering information which is for a user of the paying terminal to input an order of an item, the second communication unit transmits the item ordering information to the paying terminal, and when the paying terminal transmits an order of item, inputted by the user of the paying terminal based on the item ordering information, to the settlement apparatus, the first communication unit transmits the order of item to the billing terminal.

The settlement apparatus may further comprises a voice database which stores user voice data of the paying terminal, wherein: the second communication unit transmits a message which prompts the paying terminal to input user voice and receives the user voice from the paying terminal, and the processing unit, by inquiring the voice of the user using the voice database, authenticates the user.

The settlement apparatus may authenticate the user, by the processing unit retrieving authentication information registered by the user of the paying terminal from the paying terminal database, the second communication unit may transmit an instruction which inquires the authentication information to the paying terminal, and the paying terminal receives an answer inputted corresponding to the instruction from the paying terminal, and the processing unit may inquire the answer received from the paying terminal to the authentication information retrieved from the paying terminal database.

The paying terminal database may store a plurality of authentication information registered by the user, and the processing unit selects at least one of the plurality of authentication information from the paying terminal database at random.

The authentication information registered by the user of the paying terminal, which the processing unit retrieves from the paying terminal database, may be at least one of a password of the user, voice data spoken from the user, a face image data of the user, a image data of iris or retina of the user, and an image data of finger print of the user, and the answer the processing unit receiving from the paying terminal in order to inquire with the authentication information is at least one of character data, voice data, and image data.

According to the third aspect of the present invention, a billing terminal, communicating with a settlement apparatus which performs a settlement of transaction, for performing billing of the transaction, with a paying terminal which performs paying of the transaction, the billing terminal comprises: a communication unit which connects to the settlement apparatus via a telecommunication network, the communication unit transmitting an identifying number to identify the billing terminal to the settlement apparatus, and the communication unit receiving a synchronization confirmation signal indicating an establishment of synchronization with the paying terminal from the settlement apparatus; and a processing unit which performs billing processing of the transaction.

The communication unit may connect to the settlement apparatus by one of a commercial telephone line, a private line, and a radiotelephone communication. In case that the communication unit receives the synchronization confirmation signal, which indicates establishment of synchronization with the paying terminal, from the settlement apparatus, the communication unit may perform processing of the settlement of transaction to the paying terminal which is synchronized with the billing apparatus. In case that the communication unit transmits a purchase amount of the transaction to the settlement apparatus and the settlement apparatus performs the settlement of transaction to a user of the paying terminal which is synchronized with, the communication unit may receive a settlement completion notification which notifies a completion of the settlement processing from the settlement apparatus.

The communication unit may transmit an order information of the item, which prompts a user of the paying terminal to input an order of an item to the settlement apparatus, and receives the order inputted by the user of the paying terminal based on the order information from the settlement apparatus, the processing unit may calculate the purchase amount based on the order, and the communication unit may transmit the purchase amount calculated by the processing unit to the settlement apparatus, and receives a settlement completion notification which notifies a completion of the settlement process from the settlement apparatus.

In case that the user of the paying terminal orders an item to an order receiving center which accepts the order of the item and the communication unit receives the order of the user from the order receiving center, the processing unit may calculate the purchase amount based on the order, and the communication unit transmits the purchase amount calculated by the processing unit to the settlement apparatus and receive a settlement completion notification which notify a completion of the settlement process from the settlement apparatus. The communication unit may receive at least a part of attribute information of the user of the paying terminal from the settlement apparatus.

According to the fourth aspect of the present invention, a recording medium which stores a program for a computer, communicating to a billing terminal performing billing of a transaction with to a paying terminal performing paying of the transaction, and performing the settlement of transaction, the program comprises a first communication module which operates the computer to communicate to the billing terminal via a commercial telephone line or a private line; a second communication module which operates the computer to communicate to the paying terminal via a radio telephone communication; and a processing module which performs the settlement of transaction, wherein the processing module sets a transaction identifying number which identifies the transaction and the processing module synchronizes a communication to the billing terminal with a communication to the paying terminal when the paying terminal transmits a transaction identifying number which is the same as the transaction identifying number to the settlement apparatus.

According to the fifth aspect of the present invention, a method of settlement using a settlement apparatus which performs the settlement of transaction while communicating to a billing terminal which performs billing of a transaction with to a paying terminal which performs paying of the transaction, comprises steps of: establishing communication to the billing terminal based on information identifying the billing terminal, and setting a transaction identifying number to identify an order transaction of an item, when the paying terminal transmits the information identifying the billing terminal to the settlement apparatus for ordering the item; transmitting information about the billing terminal with the transaction identifying number to the paying terminal; synchronizing a communication to the billing terminal with a communication to the paying terminal when the paying terminal confirms the information about the billing terminal and transmits the transaction identifying number to the settlement apparatus; transmitting a synchronization confirmation signal which indicates that the synchronization is established with the billing terminal; receiving the order of the item from the paying terminal; transmitting the order of the item received from the paying terminal to the billing terminal; receiving a purchase amount based on the order of the item from the billing terminal; and performing a process of settlement of the transaction between the billing terminal and the paying terminal, both of which are synchronized each other by the transaction identifying number, based on the purchase amount.

According to the sixth aspect of the present invention, a settlement method using a settlement apparatus performing a settlement of a transaction for communicating to a billing terminal performing billing of the transaction with to a paying terminal performing paying of the transaction, comprises steps of: establishing communication to the billing terminal and setting a transaction identifying number to identify the transaction of order of an item, when the user of the paying terminal orders the item to a order receiving center accepting the order of the item and the billing terminal receives the order of the item ordered by the user from the order receiving center and transmits information identifying the billing terminal to the settlement apparatus; transmitting information about the billing terminal with the transaction identifying number to the paying terminal; synchronizing a communication to the billing terminal with a communication to the paying terminal, when the paying terminal confirms the information about the billing terminal and transmits the transaction identifying number to the settlement apparatus; transmitting a synchronization confirmation signal indicating the establishment of synchronization with the billing terminal; receiving a purchase amount based on the order of the item from the billing terminal; and processing settlement of the transaction between the billing terminal and the paying terminal, both of which are synchronized each other by the transaction identifying number, based on the purchase amount.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

(First Embodiment)

An electronic settlement system according to the first embodiment of the present invention will be explained as follows. Applying the electronic settlement system of the present embodiment, a user, who read a mail order advertisement in a newspaper, a magazine, a mail order catalog and so on, can order an item and execute a settlement via a network using a user terminal such as a portable telephone or a portable terminal.

Figure 1:
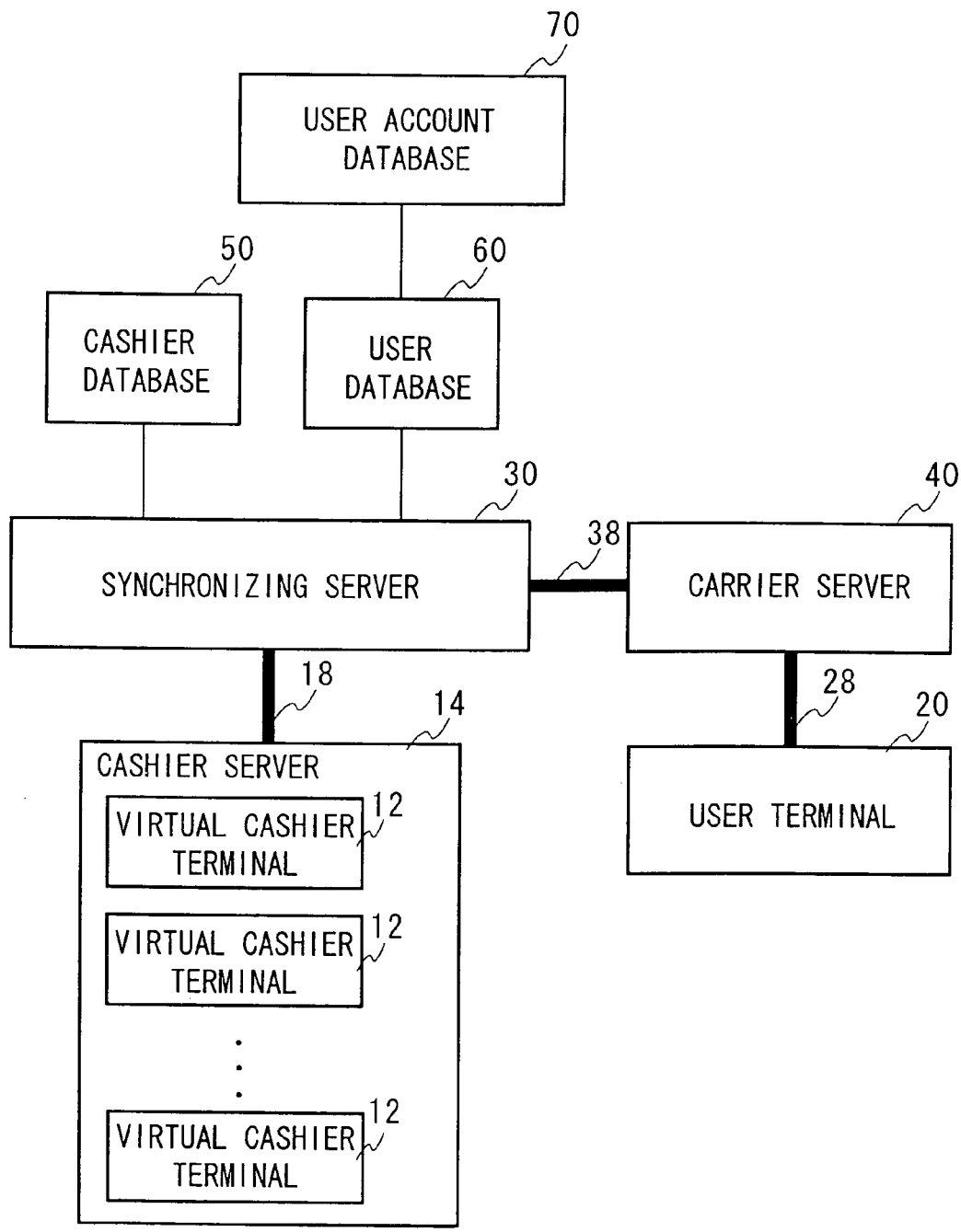
FIG. 1 is a block diagram showing a configuration of an electronic settlement system of a first embodiment of the present invention.

FIG. 1 is a block diagram showing a configuration of an electronic settlement system of the present embodiment. The electronic settlement system of the present embodiment has a virtual cashier terminal 12 as an example of a billing terminal, a cashier server 14 which includes a plurality of virtual cashier terminals 12, a user terminal 20 as an example of a paying terminal, a synchronizing server 30 as an example of a settlement device, a carrier server 40, a cashier database 50 as an example of a billing terminal database, a user database 60 as an example of a paying terminal database, and a user account database 70.

A transmission line 18, which is a communication line to connect the cashier server 14 or the virtual cashier terminal 12 with the synchronizing server 30, may be either a commercial telephone line or a private line. A radio transmission channel 28 is a transmission path of a radiotelephone communication to connect a user terminal 20 with a carrier server 40. A transmission line 38 is a communication line to connect the carrier server 40 with the synchronizing server 30, and may be either a commercial telephone line or a private line.

The cashier server 14 is a server system to represent distribution in a mail order, which is composed of virtual cashier terminals 12 in the server and performs billing of transactions to users.

The synchronizing server 30 performs a settlement of a commodity transactions processing between mail order retailers and users. The synchronizing server 30 connects the cashier server 14 with the user terminal 20 via a telecommunication network and performs data communications.

As shown in FIG. 1, the virtual cashier terminal 12 in the cashier server 14 is connected to the synchronizing server 30 via the transmission line 18 and performs data communications.

The user terminal 20 directs to pay a value of the merchandise using credit means such as a credit card or a bankcard. An example of the user terminal 20 is a radiotelephone communication means such as a cellular phone. Another example of the user terminal 20 is a portable terminal such as a PDA or a notebook type personal computer and so on, which communicates by connecting to radio communication means such as a cellular phone.

Figure 2:
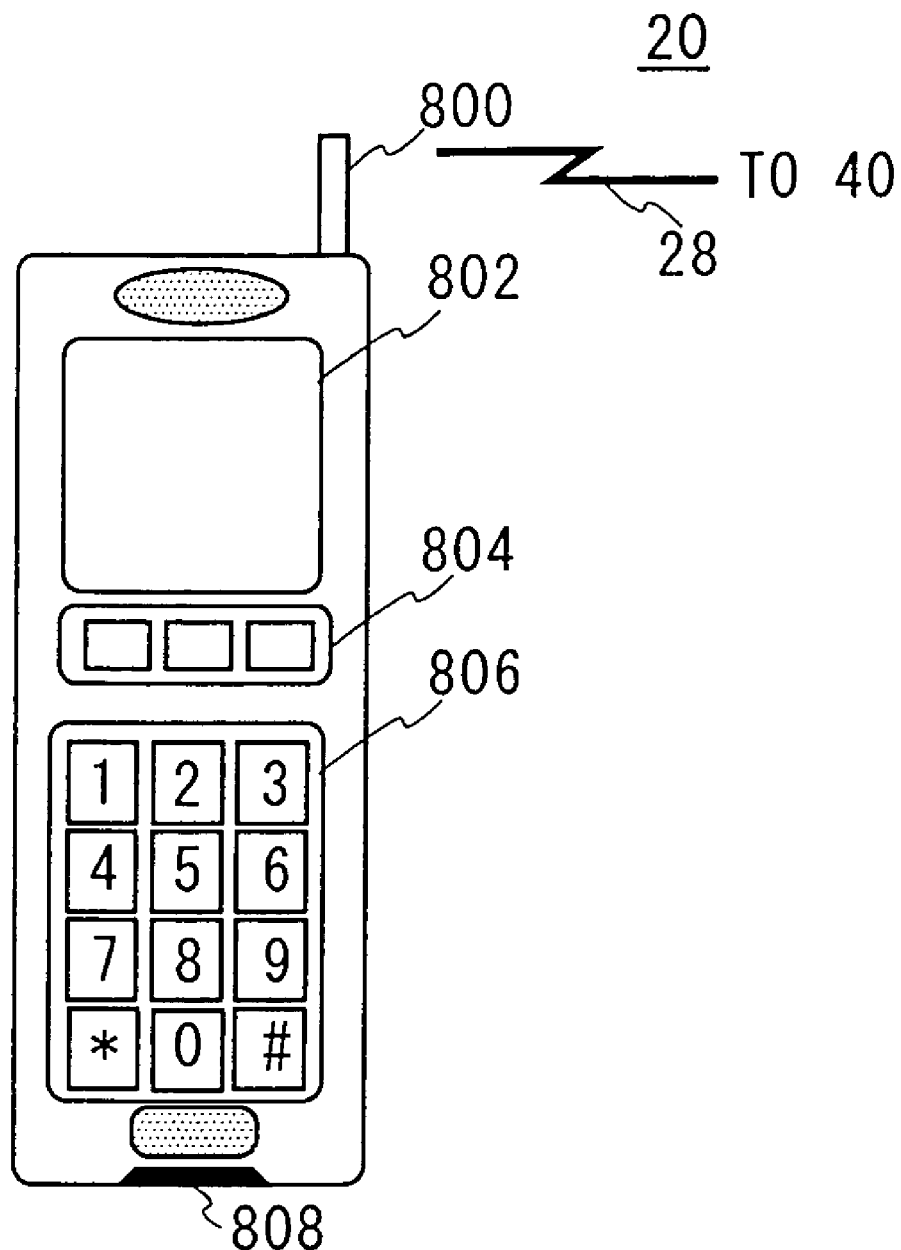
FIG. 2 shows a configuration of a cellular phone as an example of a user terminal 20.

FIG. 2 shows a configuration of a cellular phone as an example of a user terminal 20. The user terminal 20 has an antenna 800, a display unit 802, a console unit 804, a keypad 806, and an infrared communication unit 808. The user terminal 20 communicates to the carrier server 40 using the antenna 800 via a radio transmission channel 28. The user terminal 20 has a data packet communication facility and transmits and receives digital data. The display unit 802 displays character information and image information transmitted and received by the data packet communication facility. Using the console 804, a menu or buttons displayed on the display unit 802 is selected. The keypad 806 provides buttons to input telephone numbers, a password, and so on. Using the infrared communication unit 808, data communication to an apparatus having the infrared communication facility is performed.

The user terminal 20 connects to the carrier server 40 via the radio transmission channel 28. The carrier server 40 connects to the synchronizing server 30 via the transmission line 38. A direct communicating means does not exist between the virtual casher terminal 12 and the user terminal 20.

The synchronizing server 30 acquires information about the billing of a commodity transaction by communicating to the virtual cashier terminal 12, and information about the paying of a commodity transaction by communicating to the user terminal 20, and then processing the settlement of transactions between the virtual cashier terminal 12 and the user terminal 20 by synchronizing the communication to the virtual cashier terminal 12 with the communication to the user terminal 20.

The synchronizing server 30 connects to the cashier database 50 accumulating the information of the cashier server 14, the user database 60 accumulating the information of the user terminal 20, and the user account database 70 accumulating the information of the credit account or the bank account of users. And the synchronizing server 30 searches each database and retrieves the information. The synchronizing server 30, the cashier database 50, the user database 60, and the user account database 70 may be arranged in a network of a credit company or a bank network. However, only the user account database 70 may be arranged in the network of a credit company or the bank network, and the synchronizing server 30 may be connected to the user account database 70 via the private line.

Figure 3:
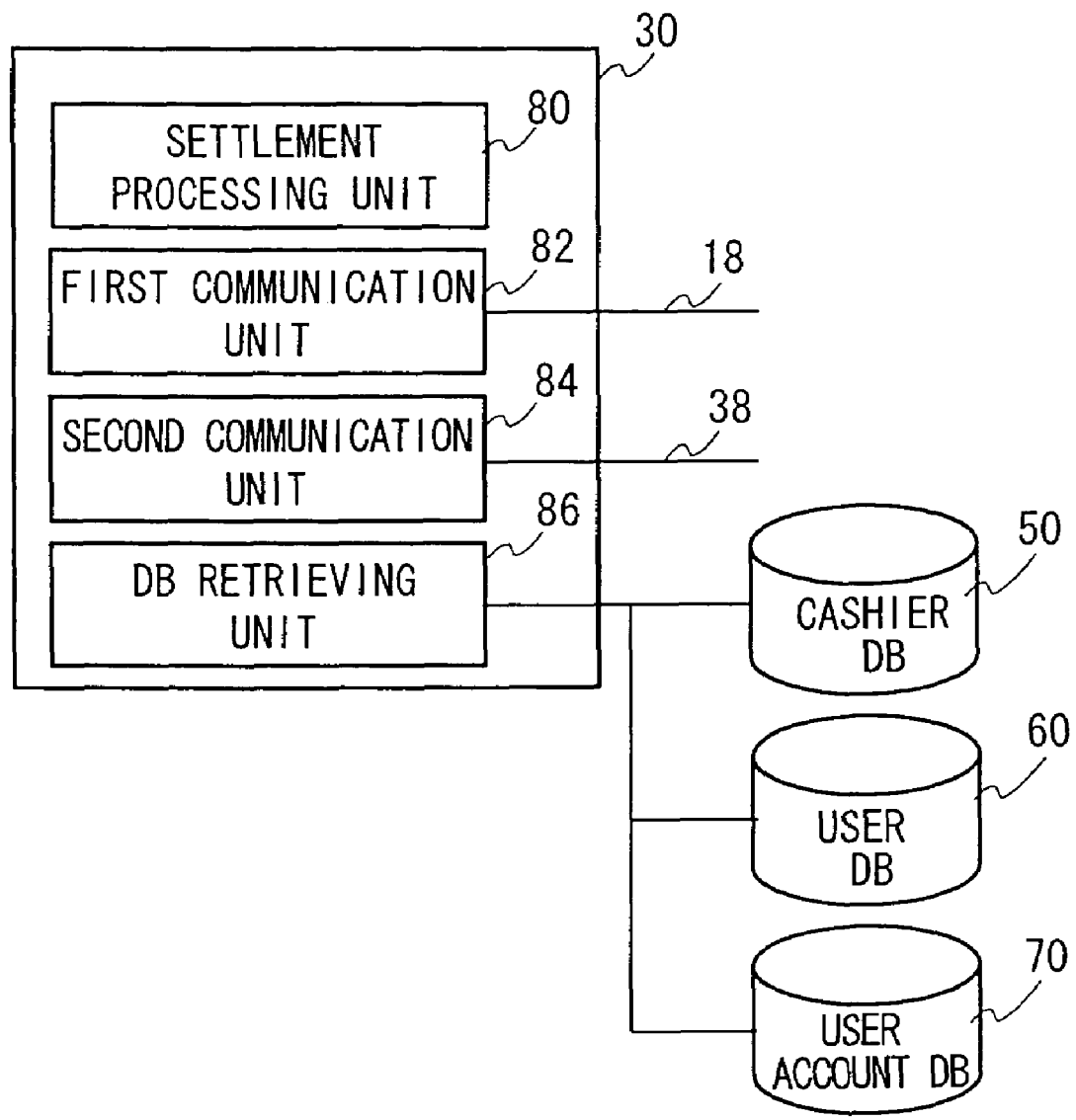
FIG. 3 is a schematic diagram showing a configuration of a synchronizing server 30.

FIG. 3 is a schematic figure showing configuration of the synchronizing server 30. The synchronizing server 30 has a settlement processing unit 80, a first communication unit 82 to process data communications via the transmission line 18, a second communication unit 84 to process data communications via the transmission line 38 or the radio transmission channel 28, a cashier database 50, a database retrieving unit 86 which accesses the user database 60 and the user account database 70 and retrieves information from the databases.

A configuration of a "synchronizing settlement" using the electronic settlement system of the present embodiment is described as follows. A "synchronizing settlement" is a method that does not communicate the virtual cashier terminal 12 with the user terminal 20 directly, but rather processes a transaction settlement between the virtual cashier terminal 12 and the user terminal 20, by synchronizing communication in real-time to the virtual cashier terminal 12 with the communication to the user terminal 20 via the synchronizing server 30 which communicates with both of the virtual cashier terminal 12 and the user terminal 20.

In the electronic settlement system, settlements of transactions are performed between a plurality of virtual cashier terminals 12 and a plurality of user terminals 20. The synchronizing server 30 needs to specify the virtual cashier terminal 12 billing the transaction and the user terminal 20 paying the transaction for each transaction in order to synchronize the communication to the virtual cashier terminal 12 with the user terminal 20 and to process the transaction of settlement between the virtual cashier terminal 12 and the user terminal 20.

In order to synchronize the communication to the virtual cashier terminal 12 with the communication to the user terminal 20, a cashier terminal identifying information, as an example of a transaction identifying information in order to identify a certain transaction, is defined. When the synchronizing server 30 connects and communicates to the cashier server 14, the synchronizing server 30 defines a cashier terminal identifying information which identifies a virtual cashier terminal 12 activated in the cashier server 14, and delivers the cashier terminal identifying information within a "link information" to the user terminal 20.

When the user answers the link information using the user terminal 20, the user terminal 20 delivers the cashier terminal identifying information to the synchronizing server 30. If a virtual cashier terminal 12 which matches the cashier terminal identifying information received from the user terminal 20 may be found in a plurality of virtual cashier terminals 12 issuing cashier terminal identifying information, the synchronizing server 30 synchronizes the communication to the virtual cashier terminal 12 with the communication to the user terminal 20. When matching cashier terminal identifying information may not be found, the user terminal 20 is not synchronized with any virtual cashier terminals 12. Thus, for a certain transaction identified by the cashier terminal identifying information, the synchronizing server 30 specifies the virtual cashier terminal 12 billing the transaction and the user terminal 20 paying the transaction using the cashier terminal identifying information, and synchronizes the communication to the virtual cashier terminal 12 with the communication to the user terminal 20, and processes the settlement. Therefore, without directly communicating the virtual cashier terminal 12 with the user terminal 20, the settlement of transactions may be performed between the virtual cashier terminal 12 and the user terminal 20.

User authentication performed by the synchronizing server 30 is described as follows. A cellular phone as an example of a user terminal 20 has a predetermined calling telephone number unique for each cellular phone, so that the predetermined calling telephone number is used with every dialing. The calling telephone number is unique to each cellular phone, and any other cellular phone can not make a phone call with the same calling telephone number. Therefore, as long as the original owner uses the certain cellular phone, the calling telephone number of a cellular phone may be used for a user specifying identification. That is, a cellular phone may work as an ID like a drivers license.

Concerning the case that the owner of a cellular phone lost his or her cellular phone and someone else uses the lost cellular phone, the cellular phone may be uniquely specified with the calling telephone number, but the user of the cellular phone may not be specified to the owner of the cellular phone. The electronic settlement system stores data corresponding to a calling telephone number of each cellular phone with the information of the owner of each cellular phone in the user database 60, and authenticates if the user of a cellular phone is the actual owner.

When the synchronizing server 30 connects to the user terminal 20, the synchronizing server 30 detects a calling telephone number of the user terminal 20, retrieves the user database 60 based on the calling telephone number, extracts information about the user, and authenticates the user. There are several authentication methods, such as visual authentication, password authentication, voice authentication, and so on. These authentication methods may be combined with each other. In case simple visual authentication is not secure enough, using complex authentication, combining with other authentication methods such as password authentication for example, may improve accuracy of the authentication.

Combining the "synchronizing settlement" and user authentication may realize an electronic settlement system that ensures security, protects privacy, and has a high level of reliability. Furthermore, a cellular phone or a portable terminal connecting for data communication to a cellular phone and so on has a portability, that is the user may take the terminal anywhere, and a simplicity, that is the user may communicate to a network via radio telephone communication from anywhere. Therefore, an electronic settlement system of the present embodiment enables to realize an electronic settlement with high reliability, security, and convenience.

Figure 5:
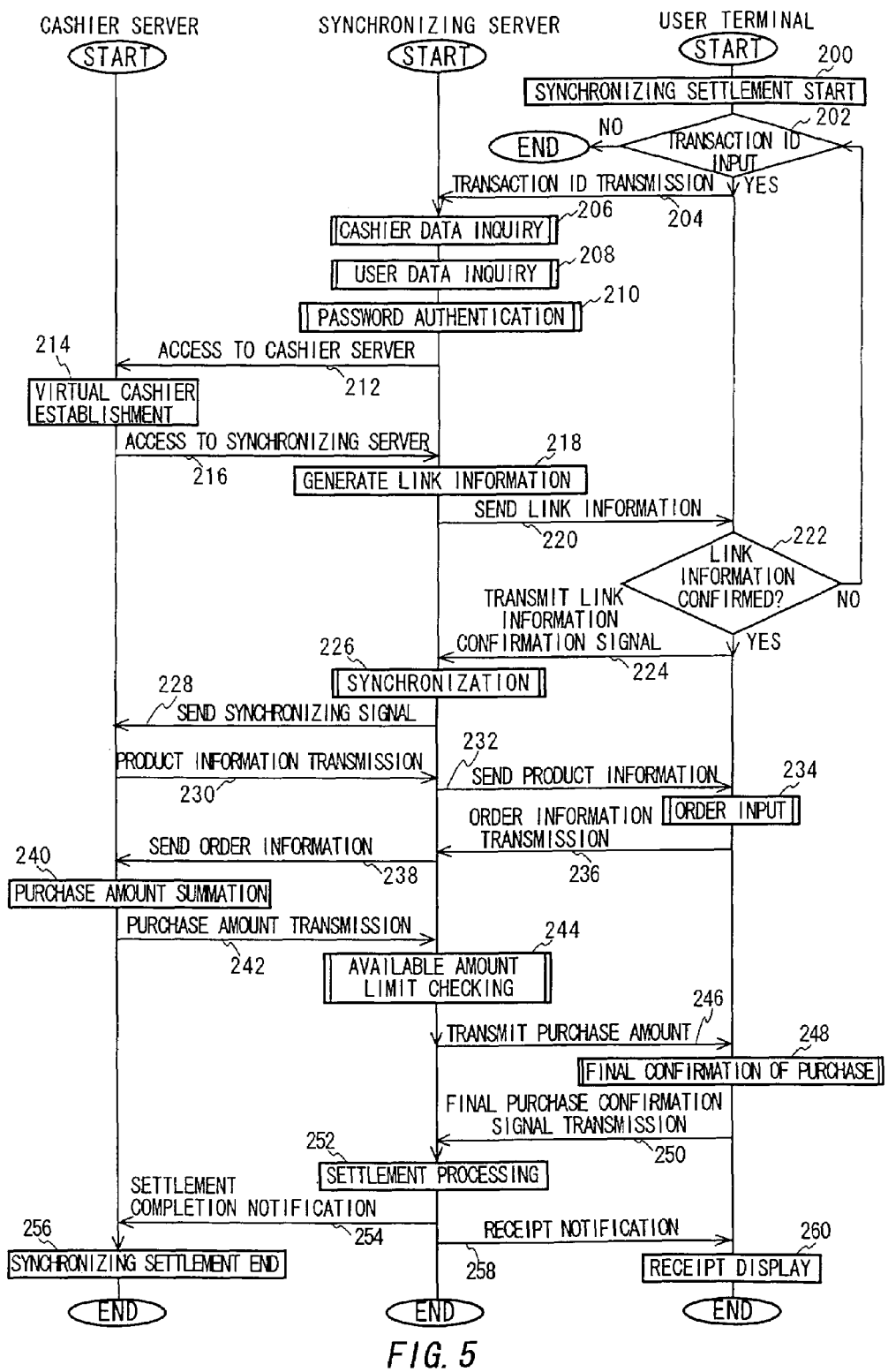
FIG. 5 is a flow chart showing a settlement processing in an electronic settlement system of the first embodiment.
Figure 11:
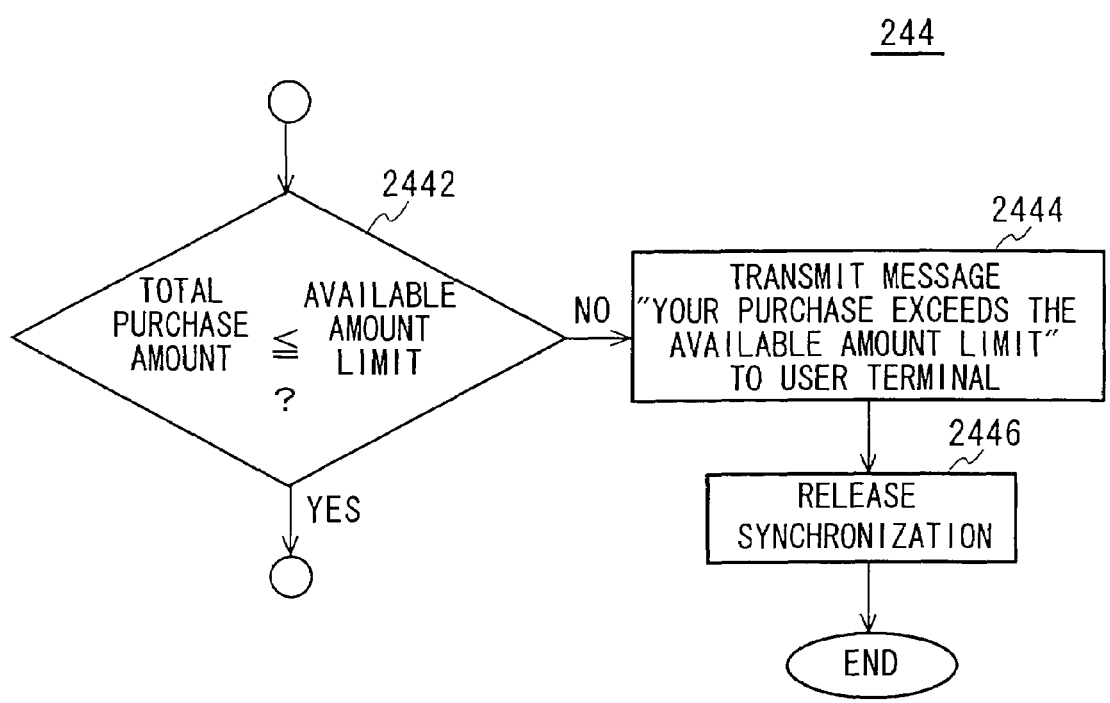
FIG. 11 is a flow chart showing an available amount checking 244 processing.
Figure 12:
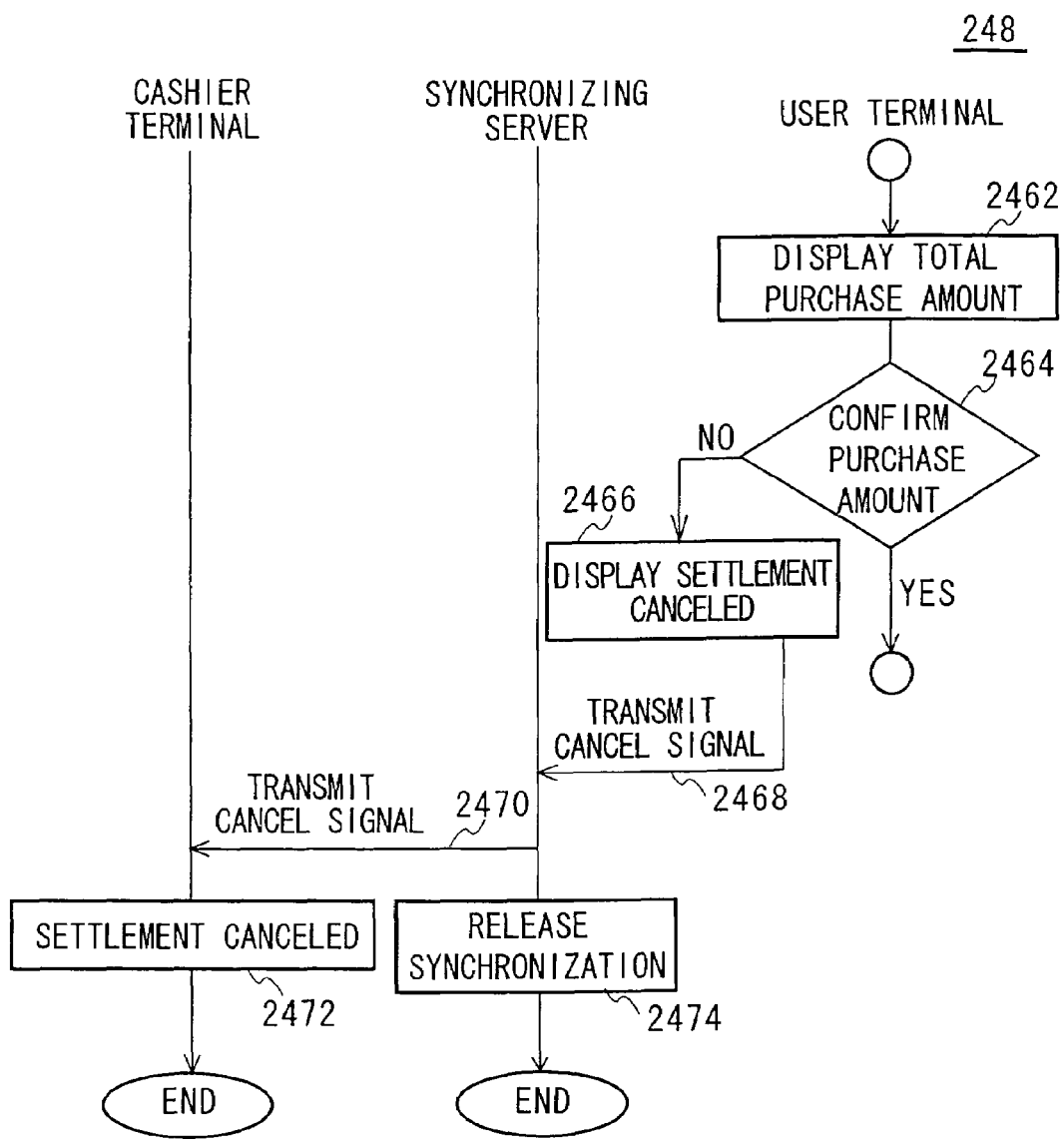
FIG. 12 is a flowchart showing a final purchase confirmation 248 processing.
Figure 13:
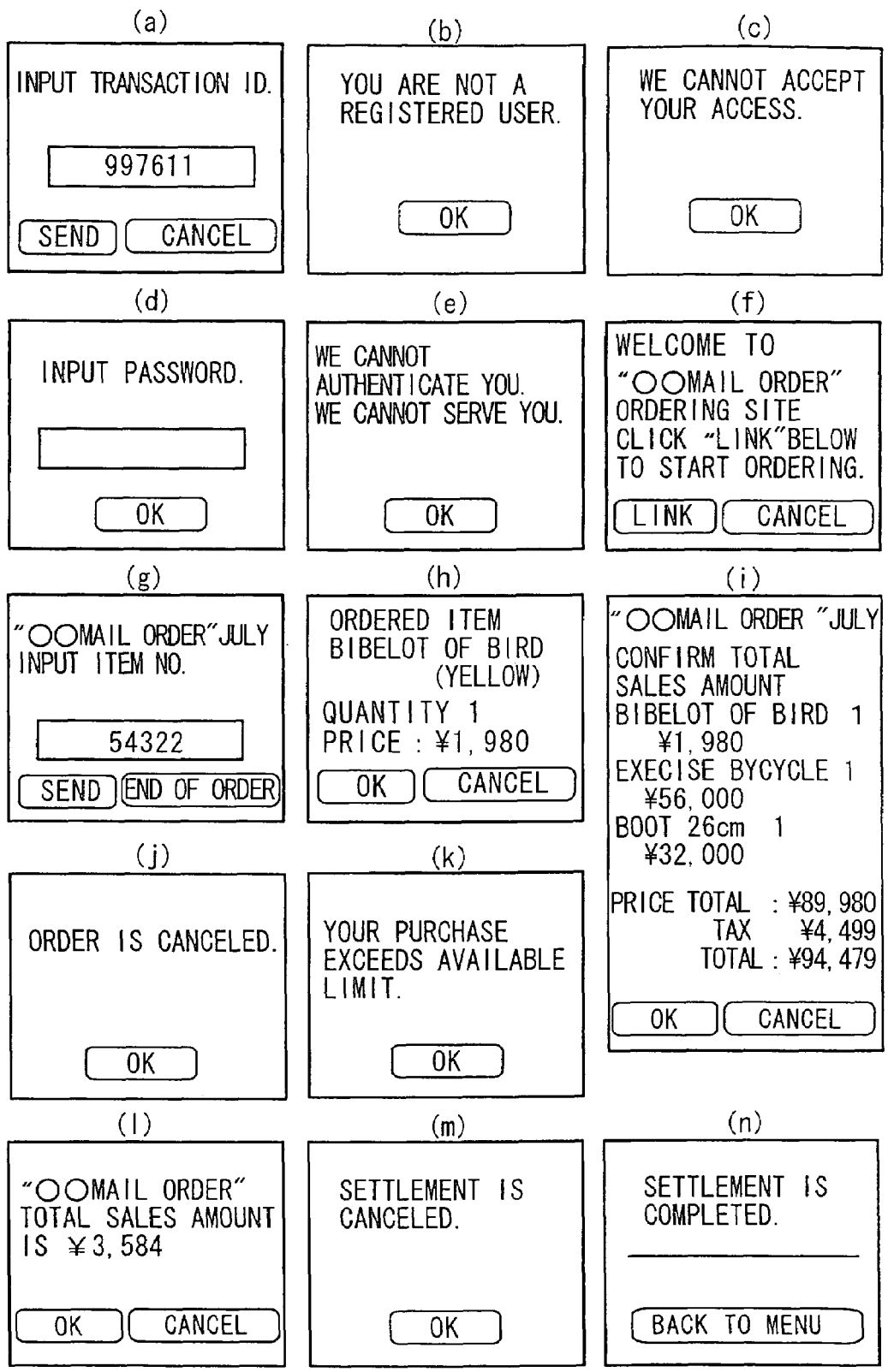
FIG. 13 shows examples of information indicated on a display unit 802 of a user terminal 20.

Referring to FIG. 5 to FIG. 13, processing of the electronic settlement in which a user settles a payment with the electronic settlement system of the present embodiment using a user terminal is described as follows. FIG. 5 is a flow chart showing a settlement processing in an electronic settlement system of the first embodiment. FIG. 6 to FIG. 12 are flow charts showing processing of details in FIG. 5. FIG. 13 is an example of information displayed on a display unit 802 of a user terminal 20.

Referring to FIG. 5, processing of the electronic settlement are described as follows. A user starts electronic settlement by choosing a settlement menu from a user terminal 20 (200).

Information prompting a user to input a "transaction ID" as shown in FIG. 13(a) is displayed on the user terminal 20. The user inputs the transaction ID listed in a mail order advertisement or a catalog (202). In the present embodiment the transaction ID is a number in order to identify a cashier server 14 performing a mail order distribution.

Figure 4:
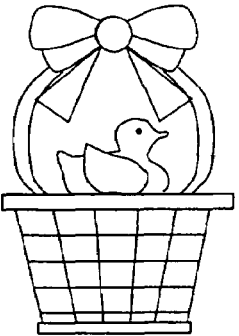
FIG. 4 shows an example of a mail order catalog.
Figure 4:
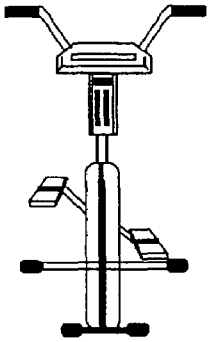
Figure 4:
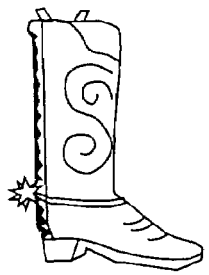

FIG. 4 shows an example of a mail order catalog. The transaction ID in order to identify the mail order retailer and item numbers for each item is written in the catalog. A user checks such a mail order catalog, orders item(s), and performs a settlement processing using a user terminal 20.

When the user chooses "transmission" in the transaction ID input information, the user terminal 20 is connected to the synchronizing server 30. The transaction ID is transmitted to the synchronizing server 30 (204). The user may choose "cancel" in the transaction ID input information if he or she wants to quit the settlement processing. This cancellation processing may be used in a case where the settlement processing may not be performed even when inputting a transaction ID correctly, caused by a communicating disorder and so on.

The synchronizing server 30 receives the transaction ID transmitted from the user terminal 20, using the transaction ID, makes an inquiry to a cashier data (206).

Figure 6:
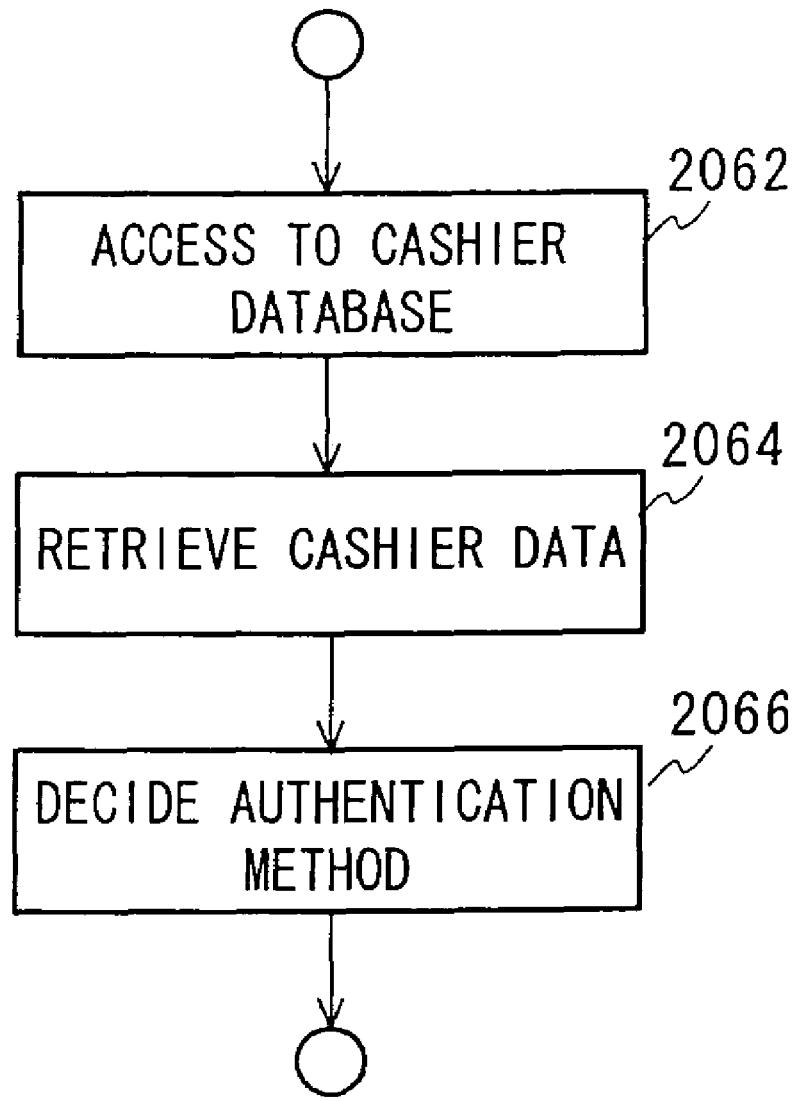
FIG. 6 is a flow chart showing a cashier data inquiry 206 processing.

Referring to FIG. 6, a processing of cashier data inquiry 206 is described as follows. The synchronizing server 30 accesses the cashier database 50 (2062) and retrieves cashier data that matches the transaction ID (2064). Information such as a retailer name, an authentication method, and an access number to the cashier server are registered as cashier data. The authentication method may be chosen from a voice authentication method, a password authentication method and so on. The cashier data includes authentication methods to be used. The synchronizing server 30 decides to adopt the authentication method registered in the cashier data (2066). Here, a case in which it was decided that a password authentication method is to be adopted as an authentication method, is described as follows.

Figure 7:
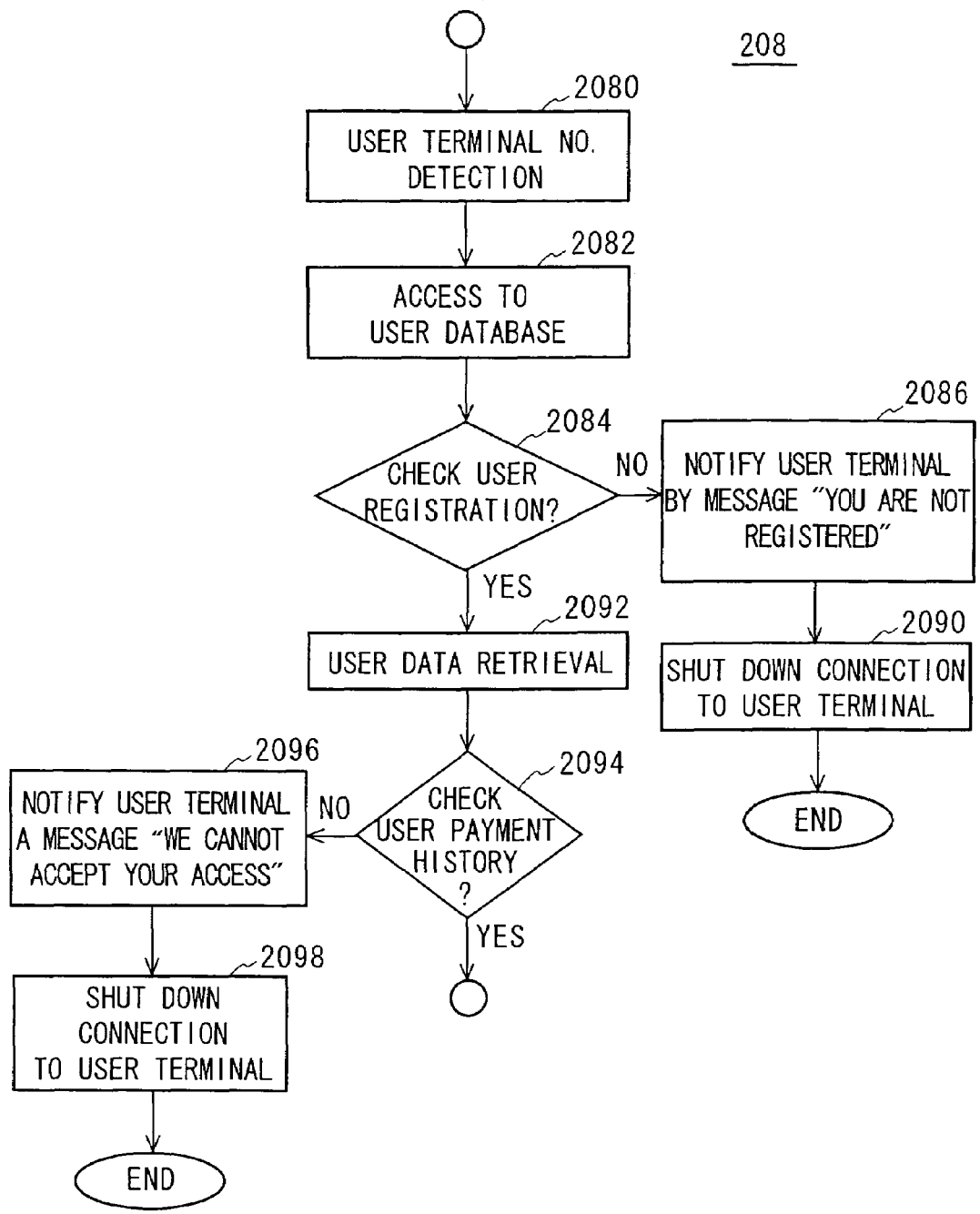
FIG. 7 is a flow chart showing a user data inquiry 208 processing.

Referring to FIG. 5 again, the synchronizing server 30 next processes the user data inquiry 208. Referring to FIG. 7, the processing of the user data inquiry 208 will be described. The synchronizing server 30 retrieves a user terminal number from user terminal 20. When the user terminal 20 is a cellular phone, a user terminal number is the calling telephone number. The synchronizing server 30 accesses the user database 60 (2082) and checks if the user terminal 20 is registered based on the user terminal number (2084). When the user terminal is not registered, the synchronizing server 30 transmits to the user terminal 20 a message "you are not registered." (2086). Information, notifying that the user does not have user registration, shown in FIG. 13(b), is displayed on the user terminal 20. The synchronizing server 30 shuts the connection to the user terminal 20 down (2090) and finishes the processing.

The synchronizing server 30 may detect the calling telephone number of the user terminal 20 when the user chooses the synchronizing settlement menu in the user terminal 20 and the user terminal 20 makes the first access to the synchronizing server 30. In another case, the synchronizing server 30 may detect the calling telephone number of the user terminal 20 when the user inputs the transaction ID to the user terminal 20 and the user terminal 20 transmits the transaction ID to the synchronizing server 30.

When the user registration is verified, user data is retrieved from the user database 60 (2092). Information about the payment history of the user is recorded in the user data. If the user has a problem in his or her payment history on his or her credit card or his or her bankcard and so on, it is checked based on the information (2094). When any problem is found in his or her payment history, a message "we cannot accept your access." is transmitted to the user terminal 20 (2096). Information notifying that settlement is rejected, shown in FIG. 13(*c*), is displayed on the user terminal 20. The synchronizing server 30 shuts the connection to the user terminal 20 down (2098), and finishes the processing.

Figure 8:
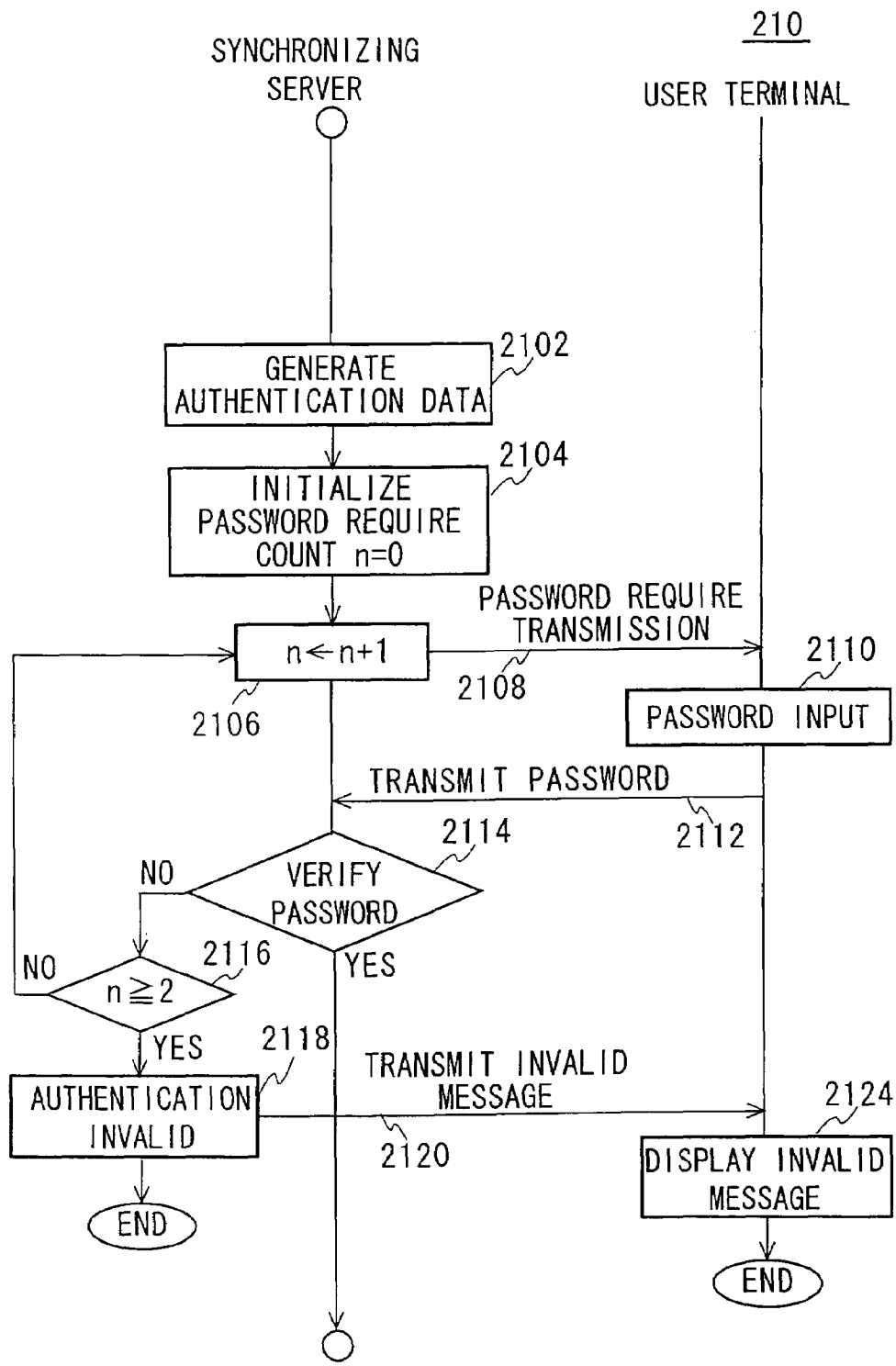
FIG. 8 is a flow chart showing a password authentication 210 processing.

Referring to FIG. 5 again, the synchronizing server 30 next processes the password authentication 210. Referring to FIG. 8, the processing of the password authentication 210 will be described as follows. The synchronizing server 30 authenticates the user terminal based on the authentication method decided in the user data inquiry 206. Here, a case that the password authentication is chosen for the authentication method is described as follows. In order to perform the password authentication, the synchronizing server 30 retrieves data necessary for authentication from the user database 60 and generates authentication data (2102). The synchronizing server 30 initializes a password require count variable n, which stores the password require count, to 0 (2104) The synchronizing server 30 increments n to n+1 (2106) and transmits a password request message to the user terminal 20 (2108). Information shown in FIG. 13(*d*) is displayed on the user terminal 20. The user inputs the password (2110). The user terminal 20 transmits the password inputted by the user to the synchronizing server 30 (2112). The synchronizing server 30 receives the password transmitted from the user terminal 20 and verifies the password (2114).

When the password transmitted from the user terminal 20 is incorrect, it is checked whether the required password count n is 2 or more (2116), if not, it goes back to the processing of 2106 and requests the password again. If the required password count n is 2 or more, the authentication processing is finished (2118) and an invalid message is transmitted to the user terminal 20 (2120). Because the authentication is not confirmed, information shown in FIG. 13(*e*) that the settlement service is not available is displayed on the user terminal 20 (2124).

In the password verification 2114, when the synchronizing server 30 verifies the correct password, the processing of the password authentication 210 is finished.

Referring back to FIG. 5 again, the synchronizing server 30 accesses the cashier server 14 using the access number for the cashier server that is retrieved in the processing of the cashier data inquiry 206 (212). The cashier server 14 activates the virtual cashier terminal 12 configured in the cashier server 14 (214). The virtual cashier terminal 12 is an apparatus or a processing working as a cashier terminal, and may be a terminal device provided in the cashier server or a program activated in the cashier server. The virtual cashier terminal 12 accesses the synchronizing server 30 (216).

The synchronizing server 30 creates "link information" (218). The link information includes cashier server identifying information to identify a virtual cashier terminal 12 connected to the synchronizing server 30 and cashier identifying information to identify the cashier server 14, such as the name of the retailer and a welcome message. The synchronizing server 30 sends the link information to the user terminal 20 (220). The user terminal 20, receiving the link information from the synchronizing server 30, displays the welcome message shown in FIG. 13(*f*) on the display. The user may confirm by looking at this information that the site is the correct mail order site he or she wanted to connect to. When the user chooses a link on the information, the user terminal 20 transmits a link information confirming signal to the synchronizing server 30 (224). The link information confirming signal includes the cashier terminal identifying information to identify the virtual cashier terminal 12 included in the link information.

When the user chooses "cancel" at this point, the electronic settlement may be canceled. This cancellation processing is performed in such a case that the user inputted a wrong transaction ID and an unwanted mail order site is shown in the display and so on.

Figure 9:
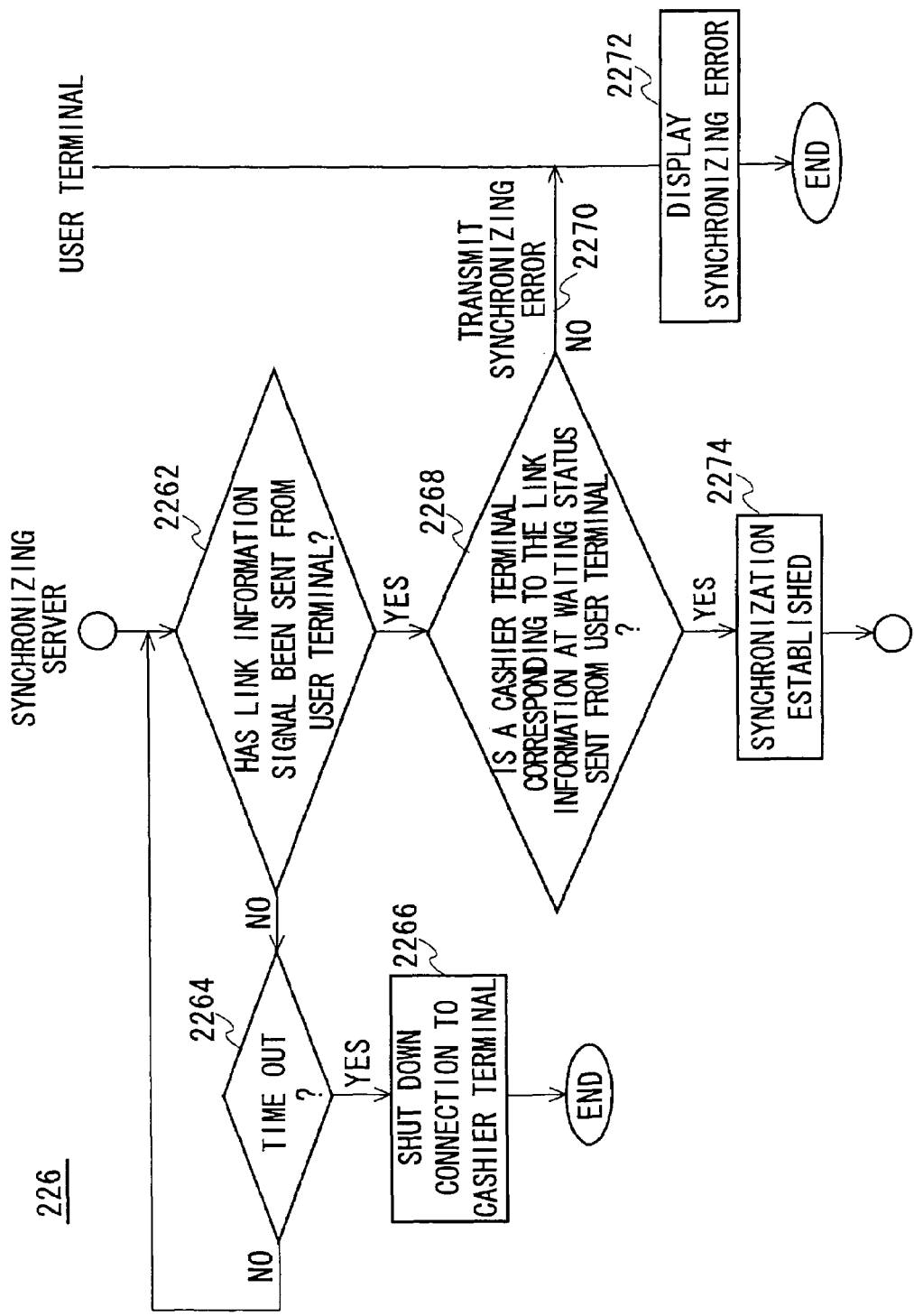
FIG. 9 is a flow chart showing synchronization 226 processing.

The synchronizing server 30 establishes synchronization when a link information confirming signal is received from the user terminal 20 (226). Referring to FIG. 9, a processing of the synchronization 226 will be described as follows.

The user terminal 20 transmits the link information confirming signal corresponding to the link information sent from the synchronizing server 30, so that the synchronizing server 30 establishes "synchronization" status.

First, the synchronizing server 30 is on an "access wait" status, that is waiting to be accessed by the user terminal 20 and for a link information confirming signal to be sent. In this "access wait" status, if a user terminal 20 using the same link information to be allocated to the virtual cashier terminal 12 accesses, the synchronizing server 30 establishes one to one "synchronization" status between that virtual cashier terminal 12 and the user terminal 20, and realizes a synchronization of the communication to the virtual cashier terminal 12 with the communication to the user terminal 20. Access from a plurality of the user terminals 20 will not be matched for one link information.

A time out limit is set up for the "access wait" status of the synchronizing server 30, and limits the access wait period with the user terminal 20 to a predetermined length, for example, 3 minutes. When no answer is obtained for the link information issued from the user terminal 20 after the time out limit, the synchronizing server 30 shuts down the connection to the virtual cashier terminal 12, and initializes it. This time out function is set up in order to avoid trouble for cases where a user cancels the processing or that a communicating condition of the user terminal 20 with the synchronizing server 30 is poor so that data communication cannot be performed normally, and so on.

As shown in FIG. 9, the synchronizing server 30 on the "access wait" status checks if access from the user terminal 20 has existed, and if a link information confirming signal has been sent from the user terminal 20 (2262). If there has been no access, it checks if it exceeds the time out limit (2264), in case it exceeds, shuts the connection to the virtual cashier terminal 12 down (2266), and finishes the processing.

When the user terminal 20 transmits the link information confirming signal, it is checked whether a virtual cashier terminal 12 on the "synchronizing wait" status corresponding to that link information is found (2268), if not, it transmits a synchronizing error message to the user terminal 20 (2270). The user terminal 20 displays the synchronizing error message on the display (2272), and then the user terminal 20 shuts the settlement processing down, and finishes the settlement.

When a virtual cashier terminal 12, which corresponds to the link information transmitted from the user terminal 20, is found and on the "synchronizing wait" status, the synchronizing server 30 establishes a "synchronizing" status between that virtual cashier terminal 12 and the user terminal 20 and synchronizes the communication with the virtual cashier terminal 12 and the communication to the user terminal 20 (2274).

Referring back to FIG. 5 again, when the synchronization is established, the synchronizing server 30 sends a synchronizing signal to the virtual cashier terminal 12 (228). The virtual cashier terminal 12 receives the synchronizing signal from the synchronizing server 30 and transmits product information for mail ordering (230). The synchronizing server 30 sends the product information received from the virtual cashier terminal 12 to the user terminal 20 (232).

The user terminal 20 prompts the user to input to the user terminal 20 an order of an item, based on the product information received from the synchronizing server 30, (234).

Figure 10:
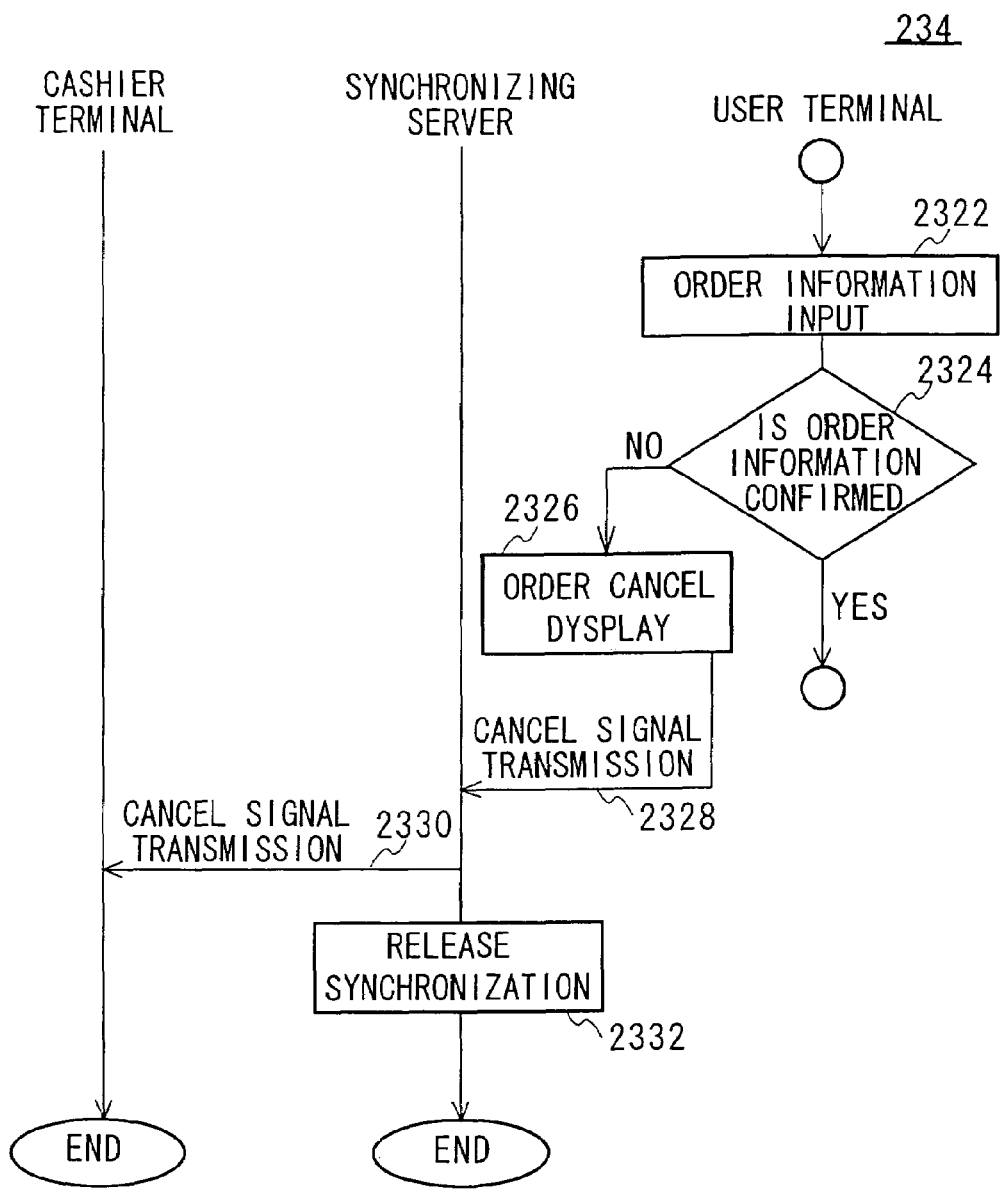
FIG. 10 is a flowchart showing an order input 234 processing.

Referring to FIG. 10, a processing of the order input 234 will be described as follows. Information for an order input as shown in FIG. 13(g) is displayed on the user terminal 20. The user, referring to the mail order catalog shown in FIG. 4, orders an item by inputting an item number (2322). When the user chooses "send" and transmit the item number, information shown in FIG. 13(h) is displayed so that the user may confirm the chosen item. If the user chooses "OK" in FIG. 13(h), the information returns back to FIG. 13(g), and the user may input another order for the next item. If the user chooses "cancel" in FIG. 13(h), that order may be canceled. In the information shown in FIG. 13(g), when the user chooses "end of order", information shown in FIG. 13(i) is displayed and all the ordered items maybe confirmed (2324). If the user chooses "OK" in the information shown in FIG. 13(i), the processing of the order input 234 will be finished. If the user chooses "cancel" in the information shown in FIG. 13(i), the orders are canceled and information shown in FIG. 13(j) is displayed (2326), and the user terminal 20 transmits a cancel signal to the synchronizing server 30 (2328). The synchronizing server 30, which receives the cancel signal from the user terminal 20, transmits a cancel signal to the virtual cashier terminal 12. Then, the synchronizing server 30 releases the synchronizing status of the user terminal 20 with the virtual cashier terminal 12 (2332).

Referring back to FIG. 5 again, a processing after the user terminal 20 has finished the order input 234 processing will be described as follows. The user terminal 20 transmits the order information to the synchronizing server 30 (236). The synchronizing server 30 sends order information received from the user terminal 20 to the virtual cashier terminal 12 in the synchronizing status with the user terminal 20 (238).

The virtual cashier terminal 12 calculates a purchase amount based on the order information received from the synchronizing server 30 (240), and transmits to the synchronizing server 30 the purchase amount information including the purchase amount (242). The synchronizing server 30, receiving the purchase amount information from the virtual cashier terminal 12, performs the processing of the available amount checking 244.

Referring to FIG. 11, the processing of the available amount checking 244 will be described as follows. The synchronizing server 30 compares the purchase amount transmitted from the virtual cashier terminal 12 with the available amount limit retrieved from the user database 60 in the user data inquiry 208 (2442), if the purchase amount does not exceed the available amount limit, the inquiry processing is finished. If the purchase amount exceeds the available amount limit, a message "your purchase exceeds your available amount limit" is transmitted to the user terminal 20 (2444). The synchronizing status of the virtual cashier terminal 12 with the user terminal 20 is released (2446). Then, information shown in FIG. 13(k) is displayed on the user terminal 20.

Referring back to FIG. 5 again, the processing after available amount checking 244 completed will be described. The synchronizing server 30 transmits purchase amount information including the purchase amount to the user terminal 20 (246). The user terminal 20, receiving purchase amount information from the synchronizing server 30, performs the processing of the final purchase confirmation 248.

Referring to FIG. 12, the processing of the final purchase confirmation 248 will be described as follows. The user terminal 20 displays information shown in FIG. 13 (l) in order to display the purchase amount (2462). The user confirms if the purchase amount is correct (2464). If correct, the user chooses the "OK" on the display and finishes the processing of the final purchase confirmation 248. If the purchase amount is incorrect, the user chooses to "cancel". When the user chooses to "cancel", information which shows the settlement is canceled as shown in FIG. 13(m) is displayed on the user terminal 20 (2466), the user terminal 20 transmits a cancel signal to the synchronizing server 30 (2468). The synchronizing server 30, receiving the cancel signal from the user terminal 20, transmits a cancel signal to the virtual cashier terminal 12 (2470). The virtual cashier terminal 12 cancels the settlement, and finishes the processing (2472). The synchronizing server 30, after transmitting the cancel signal to the virtual cashier terminal 12, releases the synchronization of the communication to the virtual cashier terminal 12 with the communication to the user terminal 20, and finishes the processing (2474).

Referring back to FIG. 5 again, the processing after final purchase confirmation 248 finished will be described. The user terminal 20 transmits a final purchase confirmation signal to the synchronizing server 30 (250). The synchronizing server 30, receiving the final purchase confirmation signal from the user terminal 20, accesses the user account database 70 and performs the settlement processing which records the purchase information (252). When the settlement is completed, the synchronizing server 30 transmits a settlement completion notification to the virtual cashier terminal 12 (254), transmits a receipt to the user terminal 20 (258). The virtual cashier terminal 12 confirms the completion of the settlement and finishes the synchronizing settlement (256). The user terminal 20 displays information shown in FIG. 13(n) of the completion of the settlement (152).

Cashier terminal identifying information, as an example of transaction identify numbers described above, is information to identify the virtual cashier terminal 12, with which the user terminal 20 synchronizes to perform the transaction. A cashier terminal identifying number, for example, created by random number generation may be used as the cashier terminal identifying information. But, when the random number generation is used, a same cashier terminal identifying number may be allocated on a plurality of the virtual cashier terminals 12. In such a case, the synchronizing server 30 may not correspond a virtual cashier terminal 12 to the user terminal 20 for the transaction performed by the user terminal 20. Therefore, cashier terminal identifying numbers are allocated in the way that the same cashier terminal identifying number may not be used two or more times in a predetermined period. On the other hand, the cashier terminal identifying number may be used again after the predetermined period. Thus, without increasing the digits of the cashier terminal identifying number, uniqueness of the cashier terminal identifying number may be maintained.

The synchronizing server 30 has a further function that limits the allocation of the cashier terminal identifying number, which does not issue the cashier terminal identifying number the same as the cashier terminal identifying number of the virtual cashier terminal 12 in the "access wait" status, and ensures to prevent competition of the cashier terminal identifying number.

When there are many mail order servers, the cashier terminal identifying numbers created by random number generation may compete with each other. In such a case, in order to avoid the competition of numbers allocated by two or more cashier servers, the range of the generated random numbers for the cashier terminal identifying number to each cashier terminal may be limited.

The cashier terminal identifying number is used for corresponding to the user terminal 20 the virtual cashier terminal 12 identified by the cashier terminal identifying number and for establishing the synchronization of the communications each other. Therefore, once "synchronization" is established to the cashier terminal identifying number issued by the synchronizing server 30, and the "access wait" is released, the same cashier terminal identifying number may be used for another transaction. The cashier terminal identifying number, even though it is a number for identifying transactions, does not need to be a large digit number such as a transaction ID, which is a number unique to every transaction; but needs to be large enough to keep the uniqueness for the period being allocated to the transaction and establishing the "synchronization".

Figure 14:
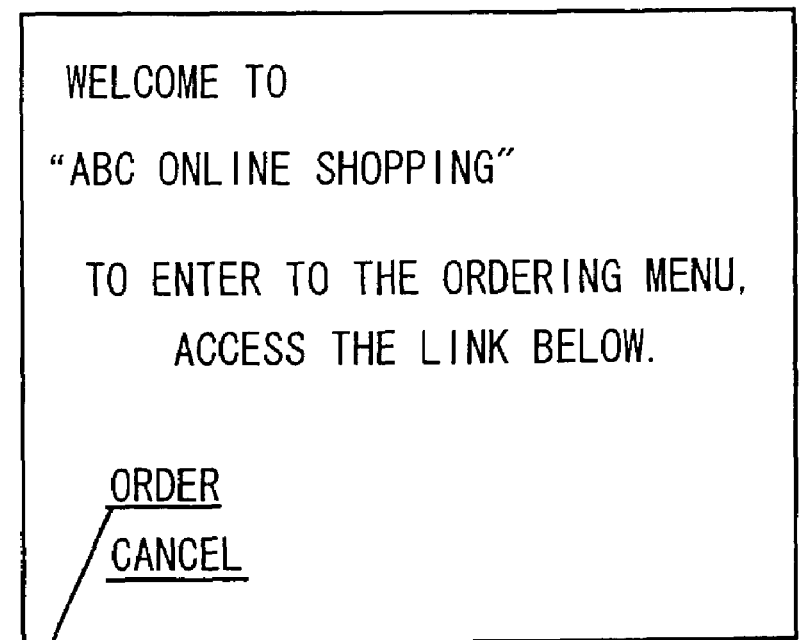
FIG. 14 shows an explanatory figure of a form of link information transmitted to the user terminal 20.

In the description above, the synchronizing server 30 sends to the user terminal 20 cashier identifying information and cashier terminal identifying information as an example of a transaction identifying number in a form of "link information". The user chooses "link" displayed on the user terminal 20. Then, the link information confirming signal, including the cashier terminal identifying information, is transmitted to the synchronizing server 30. FIG. 14 shows a form of the link information transmitted to the user terminal 20. The synchronizing server 30 sends the link information by e-mail to the user terminal 20. The e-mail includes the name of the mail order retailer, a welcome message, and an html link (UHL) that specifies the address to access the synchronizing server 30. Furthermore, the cashier identifying information and the cashier terminal identifying information are attached to the html link. In the example of FIG. 14, the html link includes "www.synchro.com" which is the address of the synchronizing server 30, "abc-onlineshop" which is the cashier identifying information, and "14685" which is the cashier terminal identifying information. With these html links, when the user accesses the html link in the e-mail, the user terminal 20 may access the synchronizing server 30 via the carrier server 40. The synchronizing server 30 may retrieve the cashier identifying information "abc-onlineshop" attached with the html link and the cashier terminal identifying information "14685". The synchronizing server 30 may correspond the user terminal 20 to the virtual cashier terminal 12, and may establish synchronization based on the obtained cashier identifying information and the cashier terminal identifying information.

In the above described settlement processing, when the synchronizing server 30 transmits the settlement completion notification 254 to the virtual cashier terminal 12, the synchronizing server 30 may retrieve a part of an attribute information about the user of the user terminal 20 which performs the payment of the settlement from the user database 60, and may transmit the information to the virtual cashier terminal 12. The attribute information about the user transmitted to the virtual cashier terminal 12 preferably may be information about sex or age of a user and so on. On the other hand, personal information such as a name, an address, and a credit card number should not be included in the attribute information. The cashier server 14 may retrieve the information about the user who performed the payment of the settlement, may store the information about the item and the user data, and may form a purchase history database in the retailer's database. Thus, the retailer may detect buying behavior, such as an age group for users of a certain item from the purchase history stored in the database, so that the history may be used for marketing.

When the synchronizing server 30 receives the purchase amount of items from the virtual cashier terminal 12, the synchronizing server 30 may also receive the name or price of purchased items and detailed information of purchased items. The synchronizing server 30 may store this information in the user database 60 as a user purchase history. The user terminal 20 may inquire about the user purchase history to the synchronizing server 30, and receive the user purchase history from the synchronizing server 30.

An electronic settlement system of the present embodiment enables users electronic ordering and payment of mail order including magazines, catalogs and so on. The user may confirm if he or she is connected to the mail order site he or she wanted before performing his or her order with the link information displayed on the portable terminal. The retailer of mail order may specify the authentication method so that the settlement may be performed after the authentication of the user with the user password and so on.

(Second Embodiment)

An electronic settlement system according to the second embodiment of the present invention will be described as follows. Applying the electronic settlement system of the present embodiment, as the first embodiment, a user may order items and execute settlement via a network. The electronic settlement system of the present embodiment adopts voice authentication for the authentication method for user authentication. The rest of the embodiment is almost the same as the first embodiment.

Figure 15:
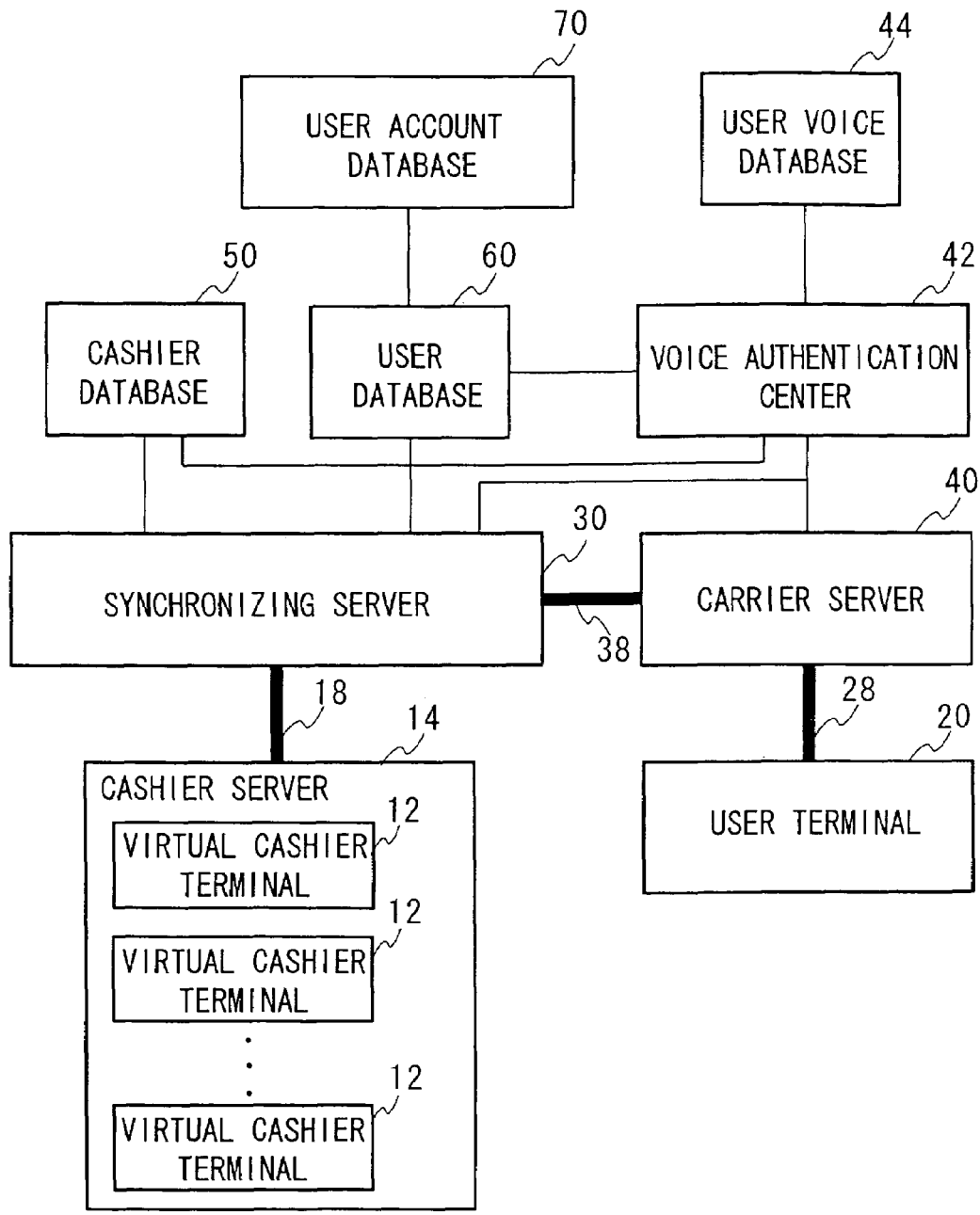
FIG. 15 is a block diagram showing a configuration figure of an electronic settlement system of a second embodiment of the prevent invention.

FIG. 15 is a block diagram showing a configuration figure of an electronic settlement system of the present embodiment. The electronic settlement system of the present embodiment has a virtual cashier terminal 12 as an example of a billing terminal, a cashier server 14 which includes a plurality of virtual cashier terminals 12, a user terminal 20 as an example of a paying terminal, a synchronizing server 30 as an example of a settlement apparatus, a carrier server 40, a cashier database 50 as an example of a billing terminal database, a user database 60 as an example of a paying terminal database, a user account database 70, a voice authentication center 42, and a user voice database 44.

The voice authentication center 42 connects to the carrier server 40. When a user terminal 20 dials via a radiotelephone communication, the voice authentication center 42 authenticates the user by the voice from the user terminal 20. The voice authentication center 42 has a user voice database 44, and inquires a user voice from the user terminal 20 to the user voice registered in advance in the user voice database 44. The user voice database 44 stores voice information registered by the user of the user terminal 20 in advance. The voice information of the user is, for example, the voice data of a predetermined registered word the user speaks.

The voice authentication center 42 connects to the cashier database 50 and the user database 60, and checks registration status and payment history of the user. The voice authentication center 42 may also retrieve the cashier server registered in the cashier database 50 based on the transaction ID the user transmitted, and checks the registration of the cashier server.

The other components marked the same as in FIG. 1 will not be described here because these components have the same action and construction as the first embodiment.

Figure 16:
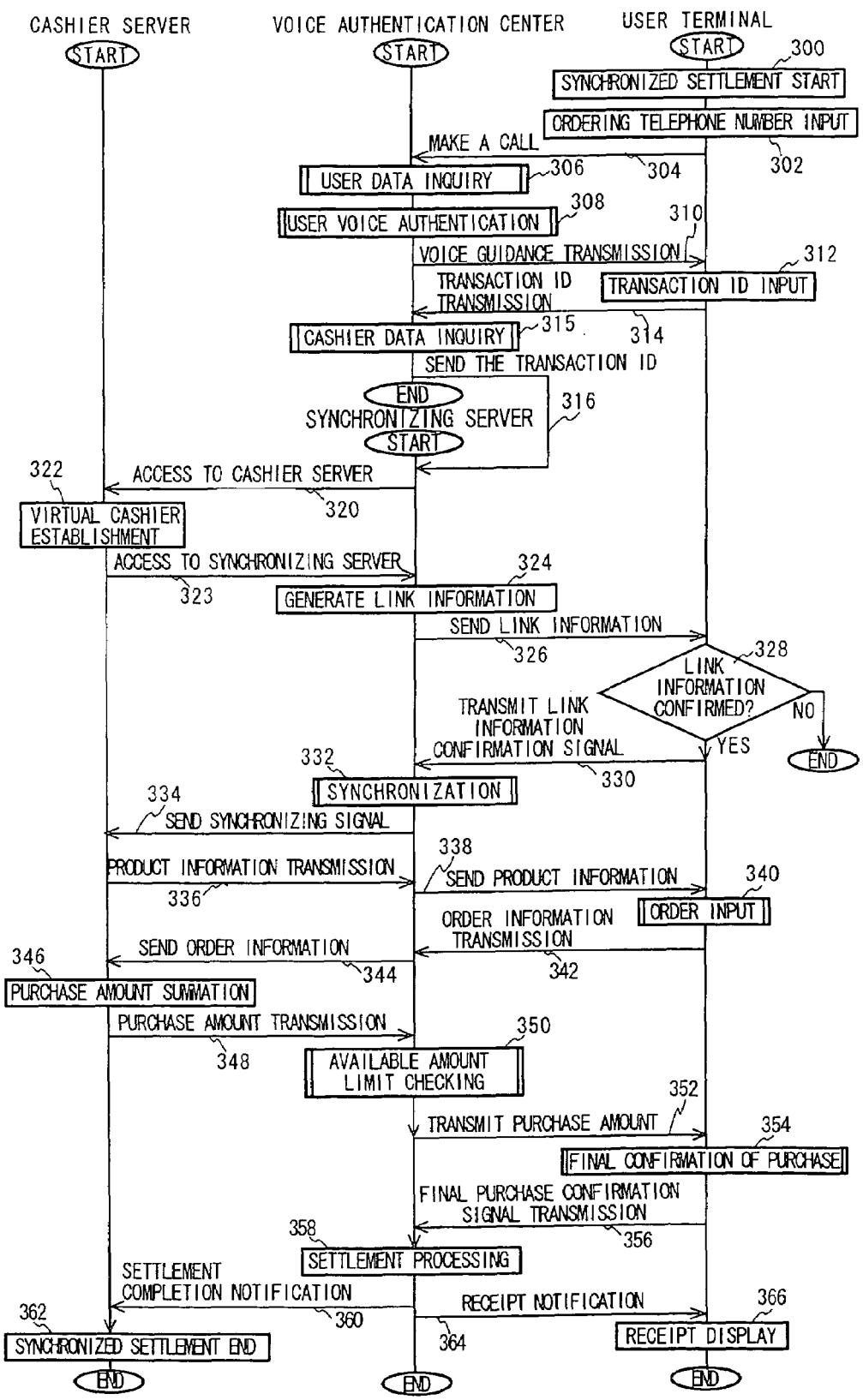
FIG. 16 is a flow chart showing processing a settlement using an electronic settlement system of the second embodiment.
Figure 17:
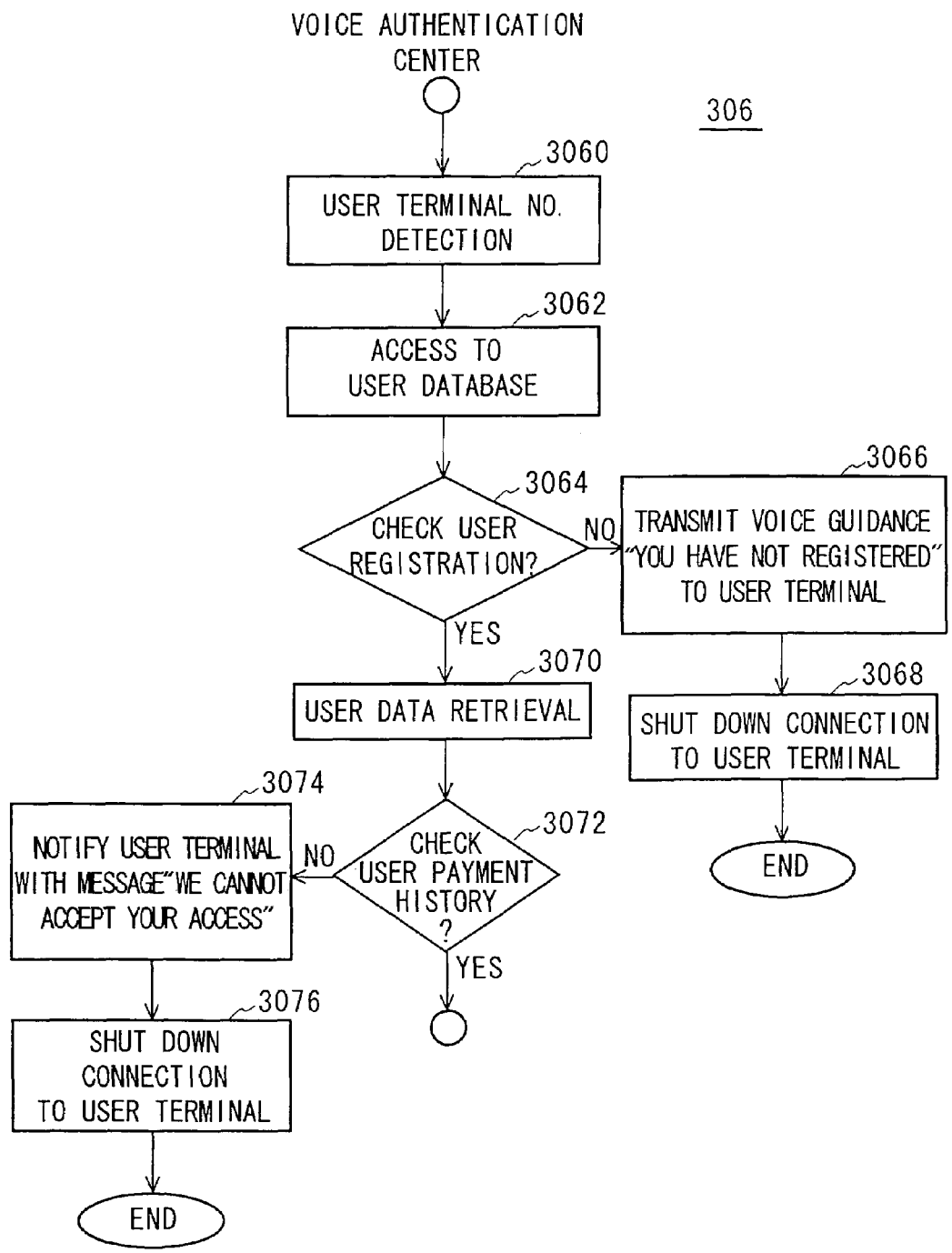
FIG. 17 is a flow chart showing a user data inquiry 306 processing.
Figure 18:
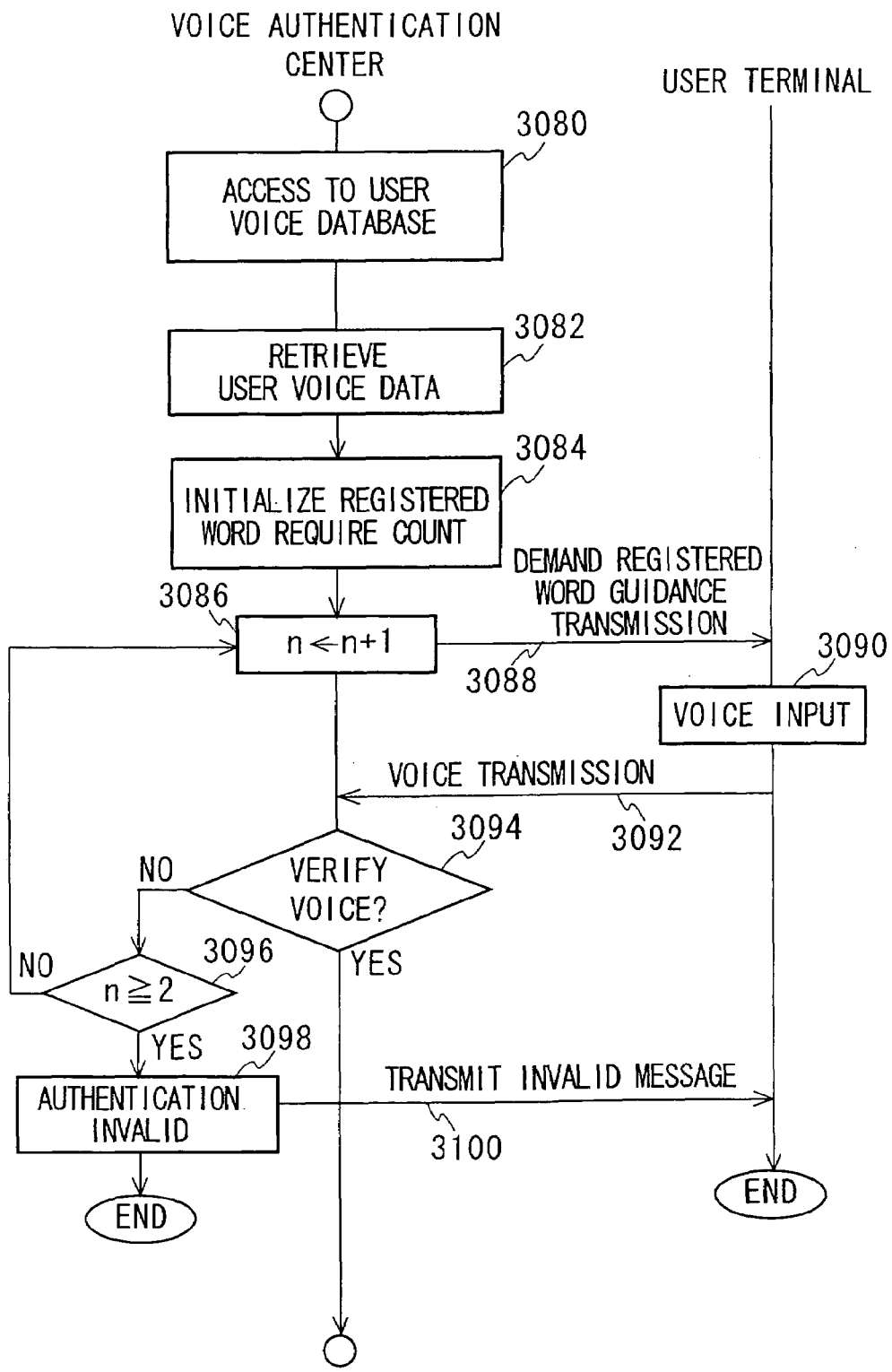
FIG. 18 is a flow chart showing a voice authentication 308 processing.
Figure 19:
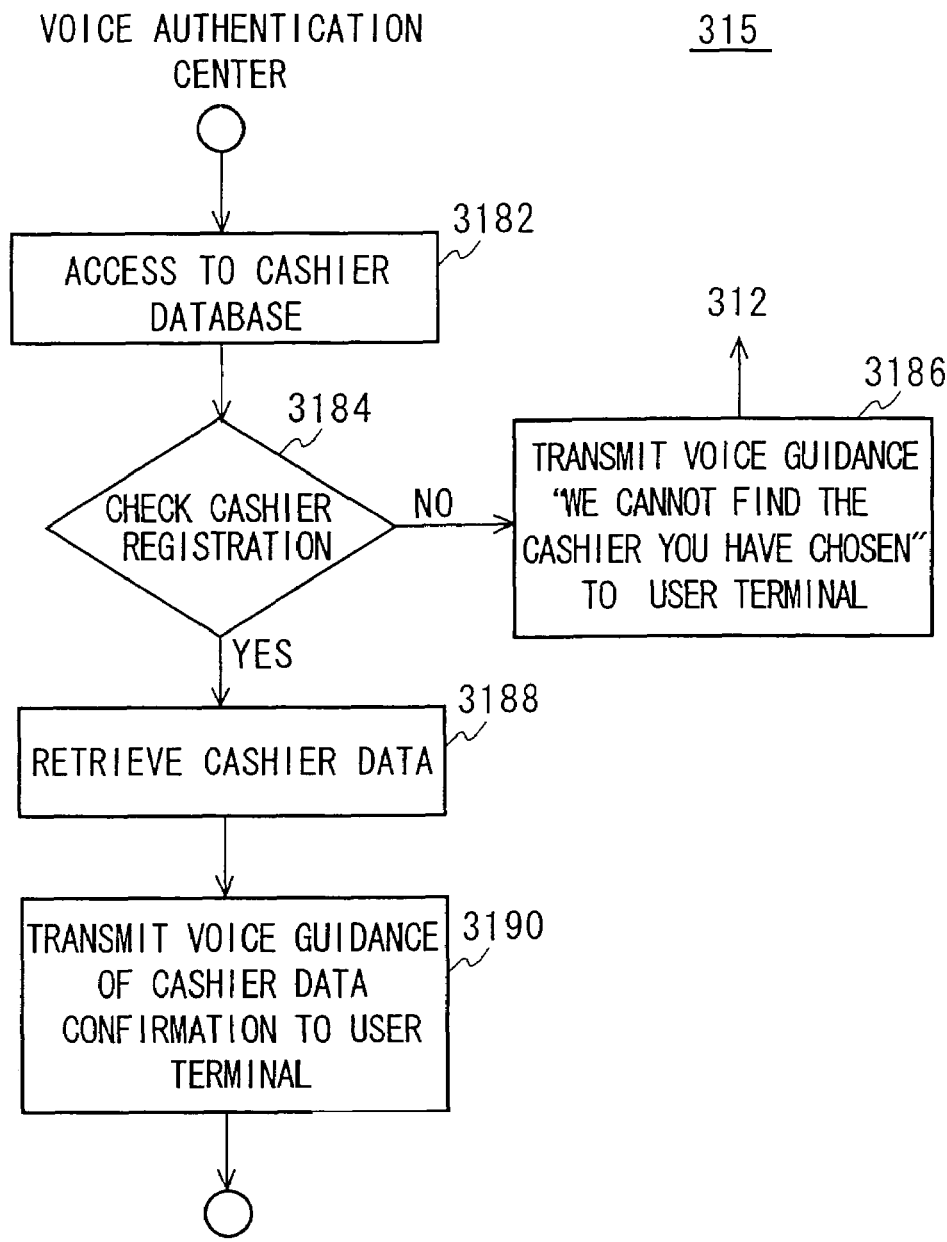
FIG. 19 is a flow chart showing a cashier data inquiry 315 processing.

Referring to FIG. 16 to FIG. 19, processing of the electronic settlement of the present embodiment are described as follows. FIG. 16 is a flow chart showing the settlement processing according to the electronic settlement system of the present embodiment. FIGS. 17 to FIG. 19 show detailed flow charts of the processing in FIG. 16.

A difference of the present embodiment from the first embodiment is, when a user terminal 20 chooses the synchronizing settlement menu and starts a settlement, the user terminal 20 is connected to the voice authentication center 42 via the carrier server 40, and a voice authentication is performed. Other processing are the same as the first embodiment. Here, the processing that are different from the first embodiment will be described.

First, the user chooses the electronic settlement menu from the user terminal 20 and starts an electronic settlement (300). Information directing the user to input an "ordering telephone number" is displayed on the user terminal 20. The user inputs an "ordering telephone number" listed in an advertisement of a mail order or a catalog (302), and a telephone call is made (304). "Ordering telephone number" is a telephone number of the voice authentication center 42. The user terminal 20 is connected to the voice authentication center 42 with a telephone communication line. Information from the user terminal 20 to the voice authentication center 42 is transmitted by voice or input by keypad. Information from the voice authentication center 42 to the user terminal 20 is sent by voice direction or voice guidance providing information.

When the voice authentication center 42 receives a telephone call from the user terminal 20, the voice authentication center 42 inquires the user data (306). Referring to FIG. 17, a processing of user data inquiry 306 is described as follows. The voice authentication center 42, receiving the telephone call from the user terminal 20, detects a user terminal number of the user terminal 20 (3060).

An example of the user terminal number of the user terminal 20 is a calling telephone number. When the user terminal 20 is set a calling number delivery service, the receiver may detect the calling telephone number. When the user terminal 20 does not set a calling number delivery service, the receiver may not detect the calling telephone number. In such a case the voice authentication center 42 sends to the user terminal 20 voice guidance prompting the user to set the calling number delivery service of the user terminal 20.

The voice authentication center 42 accesses the user database 60 (3062), and checks if the user terminal 20 has registered based on the user terminal number (3064). If the user terminal 20 does not have a user registration, the voice authentication center 42 transmits to the user terminal 20 voice guidance notifying the user terminal 20 is not registered in the database (3066), shuts down the connection to the user terminal 20 (3068), and finishes the processing.

When the user registration is verified, the user data is retrieved from the user database 60 (3070). Information about payment history of the user is written in the user data. The voice authentication center 42 checks if the user has a problem in his or her payment history on his or her credit card or his or her bankcard based on the information (3072). When any problem is found in his or her payment history, the voice authentication center 42 transmits the user terminal 20 voice guidance to notify that the authentication service is not available (3074), shuts the connection to the user terminal 20 down (3076), and finishes the processing. When the user does not have any problem with his payment history, the voice authentication center 42 finishes the processing of the user data inquiry 306, and goes to the next step.

Referring back to FIG. 16, the voice authentication center 42, after the processing of the user data inquiry 306, performs the processing of voice authentication 308. Referring to FIG. 18, the processing of the voice authentication 308 will be described as follows. The voice authentication center 42 accesses the user voice database 44 (3080), and detects user voice information for the user of the user terminal 20 from the user voice database 44 based on the user terminal number of the user terminal 20 previously detected (3082). The user voice information is voice data of a predetermined registered word the user speaks. A registered word require count variable n, which stores the registered word require count, is initialized to 0 (3084). The registered word require count is incremented from n to n+1 (3086). A voice guidance requiring the user to speak the word which is previously registered is transmitted to the user terminal 20 (3088). This voice guidance may be a voice message that says, "Please speak the registered word clearly after the beep. When finished, please push #." The user terminal 20 receives this voice guidance. The user speaks the registered word, so that the voice of the user is input to the user terminal 20 (3090). The spoken user voice is transmitted to the voice authentication center 42 (3092). The voice authentication center 42 verifies the voice of the registered word transmitted from the user terminal 20 to the user voice of the registered word retrieved from the user voice database 44 (3094). When the voice transmitted from the user terminal 20 and the user voice retrieved from the user voice database 44 are judged to be the same by the voice verification, the processing of the voice authentication 308 is finished. In case where the user voice the user terminal 20 does not match the registered user voice by the voice verification, the voice authentication center 42 checks whether the registered word require count n exceeds 2 (3096), if n does not exceeds 2, it goes back to the processing 3086, and repeats the request of the registered word. In a case that n exceeds 2, the voice authentication is invalid (3098), transmits voice guidance to the user terminal 20 (3100) notifying that the voice authentication is invalid, and finishes the processing.

Referring back to FIG. 16, the voice authentication center 42, finishing the processing of the voice authentication and having succeeded the user voice authentication, transmits voice guidance that prompts the user to input the transaction ID to the user terminal 20 (310). This voice guidance may be a voice message such as "You are authenticated. Please input a transaction ID". The user inputs the transaction ID from the user terminal 20 (312). In the present embodiment, the transaction ID is a number to identify a cashier server 14 performing the mail order merchandise.

The input transaction ID is transmitted to the voice authentication center 42 (314). The voice authentication center 42 makes an inquiry to a cashier data based on the transaction ID received from the user terminal 20 (315). FIG. 19 shows the details of the cashier data inquiry 315 shown in FIG. 16. The processing of the cashier data inquiry 315 will be described as follows. The cashier database 50 is accessed (3182), and checked whether a cashier server corresponding to the transaction ID is registered (3184). When a cashier server 14 is not registered, voice guidance notifying that the cashier server corresponding to the transaction ID can not be found is transmitted to the user terminal 20 (3186). A voice message saying "We cannot find the cashier you have chosen" is sent to the user terminal, and it goes back to the processing of the input of the transaction ID 312. A situation that the cashier server 14 corresponding to a transaction ID cannot be found may happen when the user input an incorrect transaction ID or when a transaction ID of the mail order retailer has passed the expiry date.

When the cashier server corresponding to the transaction ID is registered, the cashier data is retrieved (3188). Information such as a retailer name, an authentication method, and an access number to the cashier server 14 are registered in a cashier data. An access number of the cashier server 14 is retrieved from the cashier data. The access number is, for example, a connecting telephone number of the cashier server 14. When the cashier data is retrieved, the voice guidance confirming the cashier data is transmitted to the user terminal 20. For example, voice message "OO mail order catalog July is chosen. If correct, please hang up and wait for a call back from the ordering center. If incorrect, please input the transaction ID again" is sent to the user terminal 20.

Referring back to FIG. 16, the voice authentication center 42, after the processing of the cashier data inquiry 315, transmits an order receiving instruction and sends the transaction ID to the synchronizing server 30. The voice authentication center 42 transmits voice guidance "please hang up and wait for a message from the ordering center" to the user terminal 20. The telephone connection between the voice authentication center 42 and the user terminal 20 is shut down (316).

The synchronizing server 30 receives an order receiving instruction from the voice authentication center 42 and receives the transaction ID (316). The synchronizing server 30 accesses the cashier server 14 corresponding to the transaction ID (320). The cashier server 14 activates a virtual cashier terminal 12 (322). The virtual cashier terminal 12 is an apparatus or a processing performing as a cashier. The virtual cashier terminal 12 may be a terminal device provided in the cashier server, or may be a program activated in the cashier server. The virtual cashier terminal 12 is connected to the synchronizing server 30 (323).

The synchronizing server 30, when the server connects to the virtual cashier terminal 12, creates a "link information" in order to identify a transaction to the virtual cashier terminal 12 (324). The link information in the present embodiment is an example of a transaction identifying numbers that identifies the transaction between the user terminal 20 and the virtual cashier terminal 12. The synchronizing server 30 synchronizes the communication to the user terminal 20 with the communication to the virtual cashier terminal 12 based on the link information, and processes the settlement of the transaction. The link information includes not only the transaction identifying number but also cashier identifying information that identifies a cashier server 14 such as a name of a mail order retailer or a welcome message.

The synchronizing server 30 sends the link information to the user terminal 20 (326). The user terminal 20, receiving the link information from the synchronizing server 30, displaying a welcome message on the screen as shown in FIG. 13(f) of the first embodiment. The user, looking at the information, confirms whether the present site is the site he or she wants to connect to (328). When the user chooses the "link" on the display, the user terminal 20 transmits link information confirming a signal to the synchronizing server 30 (330). The link information confirming signal includes the cashier terminal identifying signal which is included in the link information in order to identify the virtual cashier terminal 12.

The user, choosing "cancel" on the display, may cancel the electronic settlement. This cancellation processing is performed in such a case that because the user inputs an incorrect transaction ID, an unwanted mail order site is displayed.

The synchronizing server 30, receiving the link information confirming signal from the user terminal 20, establishes a synchronization (332).

The settlement processing after the synchronization processing (332) will not be described here, as the processing are the same as the first embodiment.

Here, in the present embodiment, the voice authentication center 42 performs the processing of cashier data inquiry 315 and transmits the transaction ID to the synchronizing server 30. As another case, at the point of the processing when the user voice authentication 308 is completed, the voice authentication center 42 may transmit the information of the completion to the synchronizing server 30. In this case, the synchronizing server 30 performs the processing from the processing of voice guidance transmission 310 to the processing of the cashier data inquiry 315.

The electronic settlement system of the present embodiment authenticates a user by his or her voice before the electronic settlement, so that may ensure a high quality authentication.

(Third Embodiment)

The electronic settlement system according to the third embodiment of the present invention will be described as follows. Applying the electronic settlement system of the present embodiment, as the first embodiment, a user may order items and execute settlement via a network. The electronic settlement system of the present embodiment adopts image authentication for an authentication method for user authentication. The rest of the embodiment is almost the same as the first embodiment.

Figure 20:
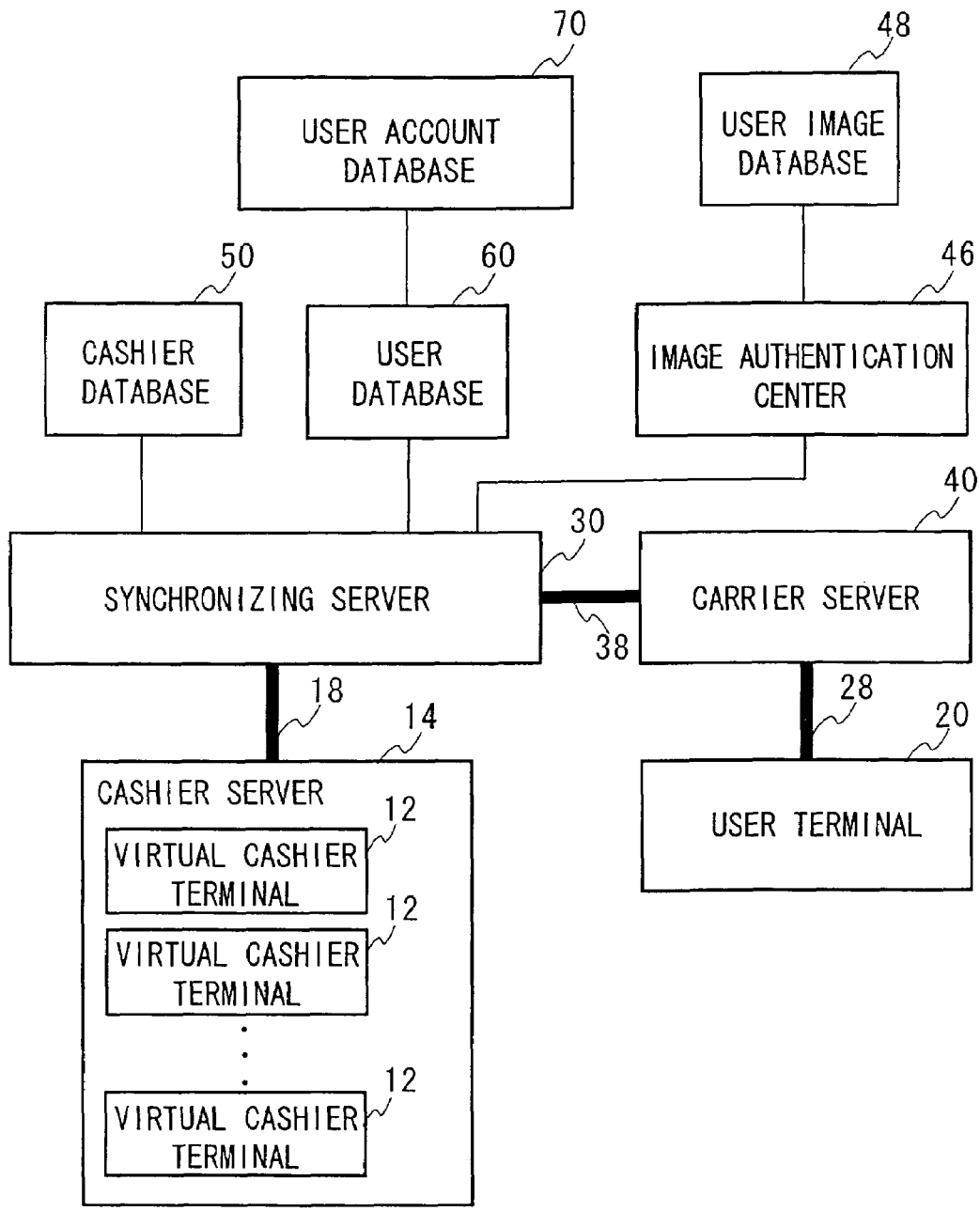
FIG. 20 is a block diagram showing a configuration figure of an electronic settlement system according to the third embodiment of the present invention.

FIG. 20 is a block diagram showing a configuration of an electronic settlement system of the present embodiment. The electronic settlement system of the present embodiment has a virtual cashier terminal 12 as an example of a billing terminal, a cashier server 14 which includes a plurality of virtual cashier terminals 12, a user terminal 20 as an example of a paying terminal, a synchronizing server 30 as an example of a settlement apparatus, a carrier server 40, a cashier database 50 as an example of a billing terminal database, a user database 60 as an example of a paying terminal database, a user account database 70, an image authentication center 46, and a user image database 48.

The image authentication center 46 authenticates a user based on an image transmitted from the user terminal 20. The image authentication center 46 has a user image data base 48, and verifies an image transmitted from the user terminal 20 with the user image previously registered in the user image database 48. Image data of a user's facial portrait, image data of an iris or a retina of the user, or image data of a user's fingerprint may be used for the user image. The user registers this image data as authentication data in the user image database 48 in advance.

Figure 21:
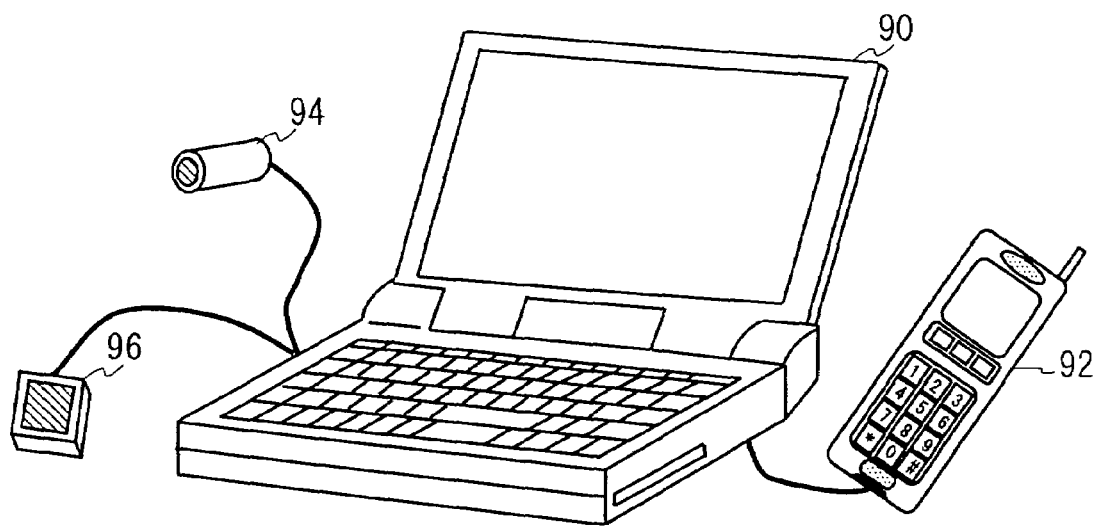
FIG. 21 shows a configuration of a portable terminal that has a communication facility as an example of a user terminal.

FIG. 21 shows a configuration of a portable terminal that includes communication facilities as an example of a user terminal 20 applying the present embodiment. The portable terminal 90 may connect to a cellular phone 92 and wirelessly communicate to networks. The portable terminal 90 may read in the user facial portrait image by connecting a CCD camera 94 or read in a user fingerprint by connecting to a finger print scanner 96. The portable terminal 90 may include a wireless communication facility working as a cellular phone 92, a scanning function working as a CCD camera 94, and a fingerprint scanning function working as a finger print scanner 96 inside the portable terminal 90.

The other components marked the same as in FIG. 1 will not be described here because these components have the same action and construction as the first embodiment.

Figure 22:
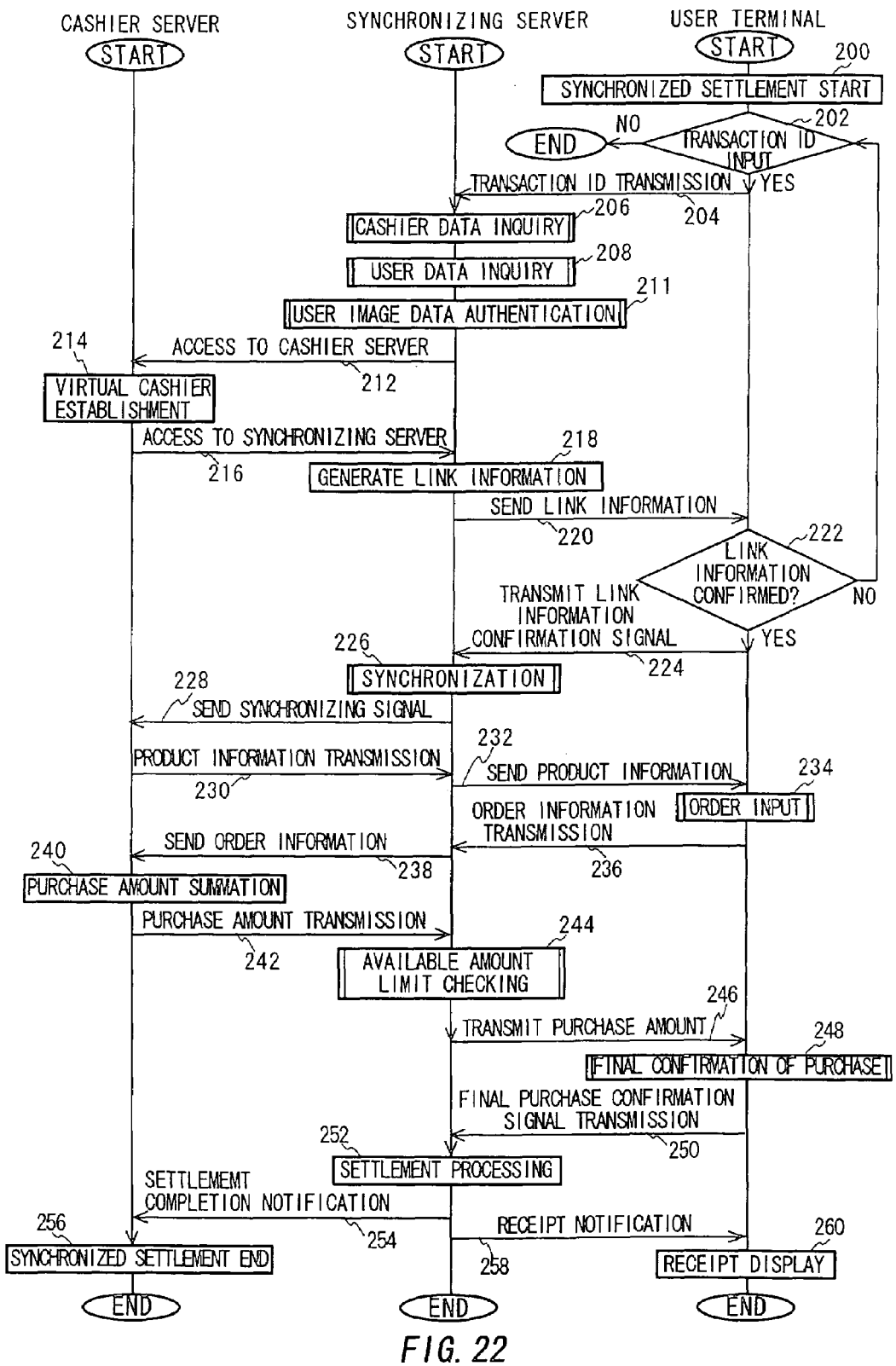
FIG. 22 is a flow chart showing the settlement processing using an electronic settlement system of the third embodiment.

FIG. 22 is a flow chart showing the settlement processing applying the electronic settlement system of the present embodiment. In FIG. 22, the processing and communications marked the same as in FIG. 5 will not described here because they are the same as the first embodiment. The processing of a user image data authentication 211, which is different from the first embodiment, will be described here.

Figure 23:
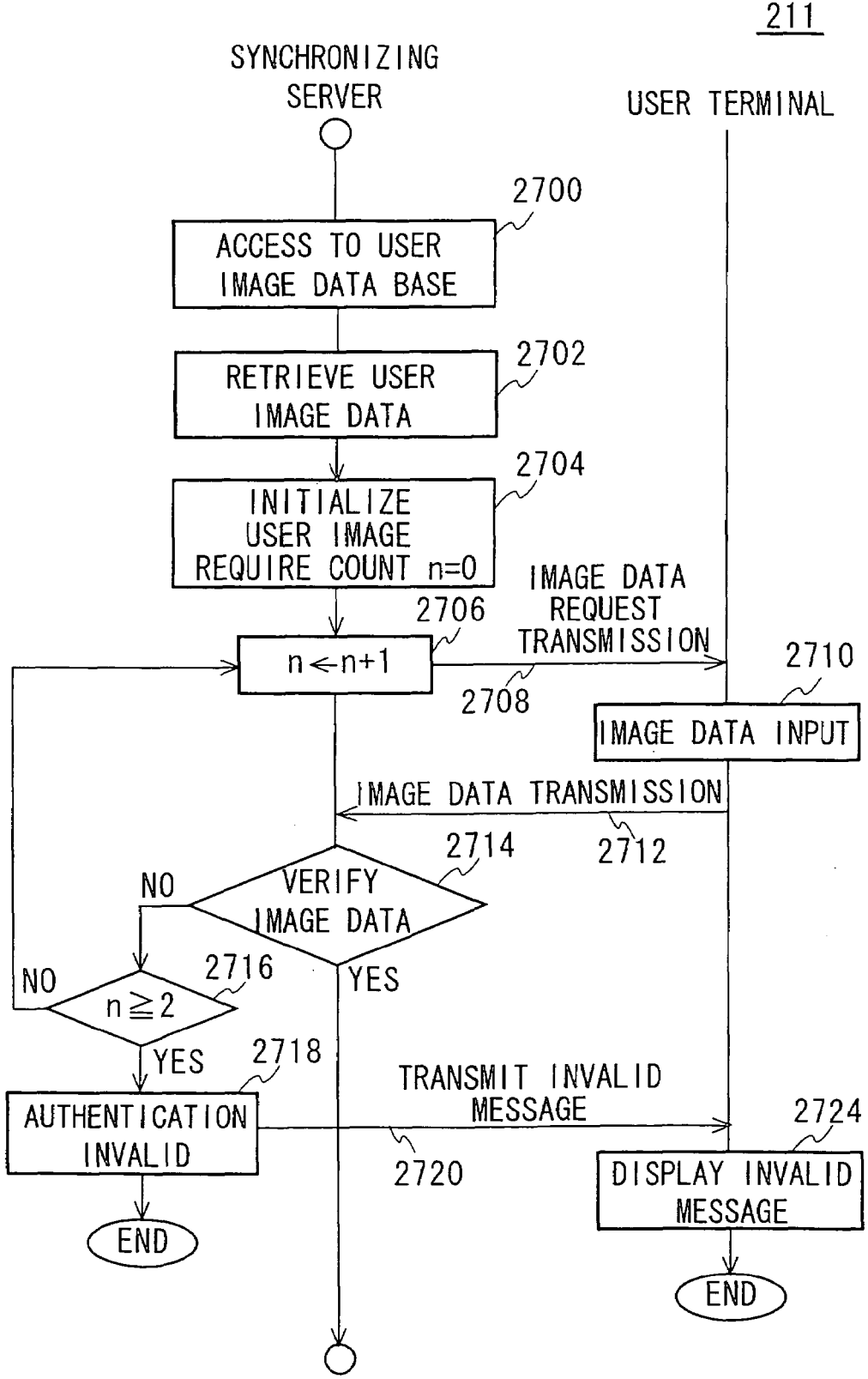
FIG. 23 is a flow chart showing a user image data authentication 211 processing.

FIG. 23 is a flow chart showing the processing of the user image data authentication 211. The synchronizing server 30 performs authentication of a user based on an authentication method decided from the cashier terminal information inquiry 206. The authentication method may be one of authentications that uses personal image information to identify the user as an individual such as a facial portrait image authentication, an authentication with an image of an iris or a retina, and an authentication with a finger print image. The synchronizing server 30, in order to perform image authentication, accesses the user image database 48 (2700), retrieves user image data necessary for authentication and generates the authentication data (2702). The synchronizing server 30 initializes image data require count variable n, which stores the imaged at a require count, to 0 (2704). The synchronizing server 30 increments n to n+1 (2706), and transmits an image data request message to the user terminal 20 (2708). Information prompting the user to input the image information such as a facial portrait image, an iris or retina image, or a finger print image of the user to the user terminal 20 is displayed on the user terminal 20. The user, using the CCD camera 94 or the finger print scanner 96 attached to the user terminal 20 and so on, inputs image data to the user terminal 20(2710). The user terminal 20 transmits the image data inputted by the user to the synchronizing server 30 (2712). The synchronizing server 30 receives the image data transmitted from the user terminal 20, and makes an inquiry to the image data retrieved from the user image database 48 (2714).

If the image data transmitted from the user terminal 20 is not matched with the image data retrieved from the user image database 48, whether the image data require count n is 2 or more is checked (2716), if not, it goes back to the processing 2706 and requests the image data again. If the image data require count n is 2 or more, the authentication processing is finished (2718) and an invalid message is transmitted to the user terminal 20 (2720). Because the authentication is not confirmed, information that the settlement service is not available is displayed on the user terminal 20 (2724).

In the image data verification 2714, when the synchronizing server 30 verifies the image data has been transmitted from the user, the processing of the user image data authentication 211 is finished.

The electronic settlement system of the present embodiment may ensure a safe electronic settlement for a user by prompting the user to transmit the image data that identifies an individual such as a facial portrait, iris or retina, or finger print in order to authenticate the user. With the image authentication, it differs from voice authentication that needs to connect a cellular phone to an audio carrier, using a data packet communication facility of a cellular phone, the authentication and the settlement may be performed in succession.

(Fourth Embodiment)

An electronic settlement system according to the fourth embodiment of the present invention will be described as follows. Applying the electronic settlement system of the present embodiment, as the first embodiment, a user may order items and execute settlement via a network. The present embodiment differs from the first embodiment as follows. The user does not need to input a transaction ID to identify a cashier server 14 which performs the mail order merchandise. The user may order an item by making a telephone call to an order-receiving center of the mail order merchandise, and may verbally explain the order to an order-receiving operator.

Figure 24:
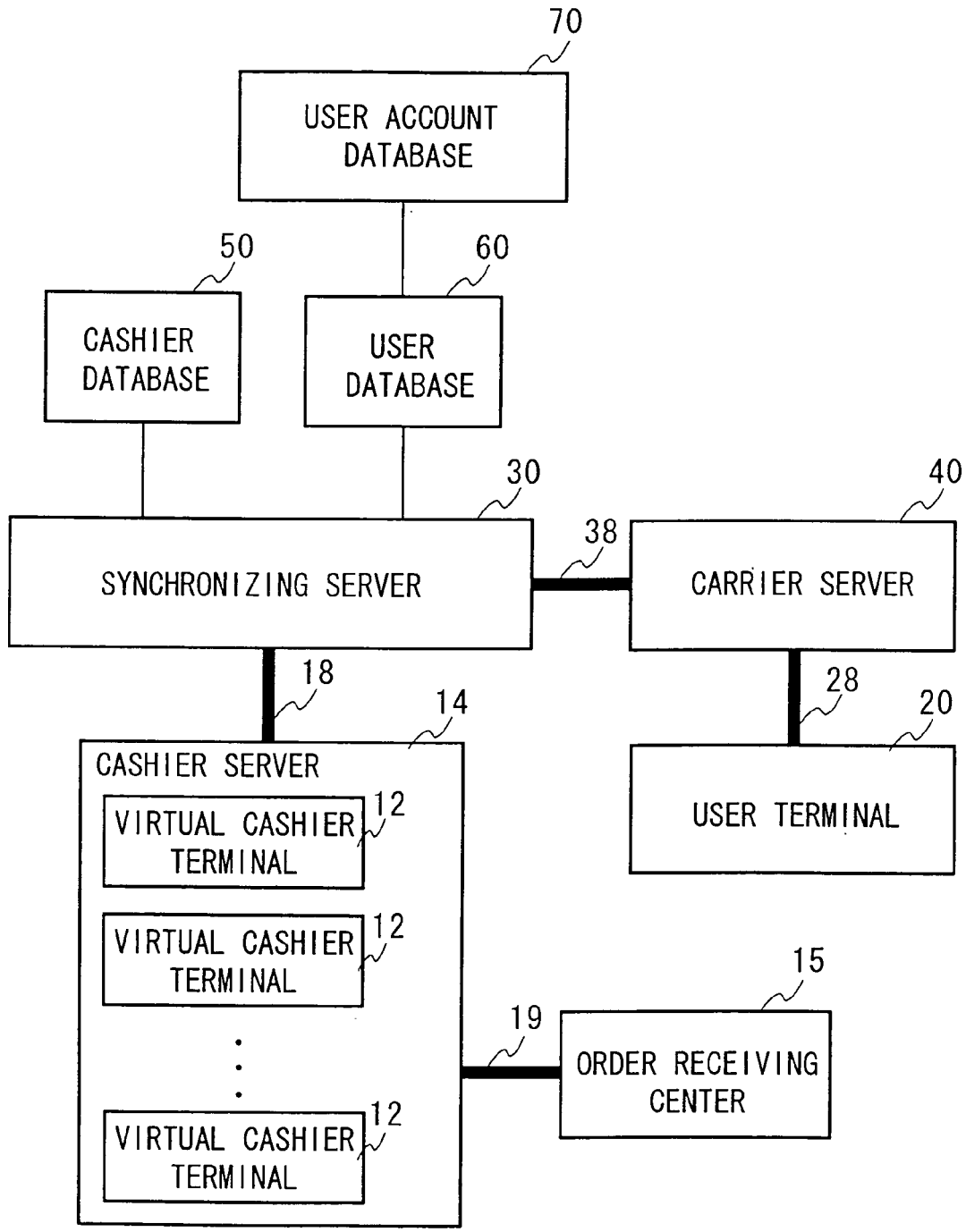
FIG. 24 is a block diagram showing a configuration figure of an electronic settlement system according to the fourth embodiment of the present invention.

FIG. 24 is a block diagram showing a configuration of an electronic settlement system of the present embodiment. The electronic settlement system of the present embodiment has a virtual cashier terminal 12 as an example of a billing terminal, a cashier server 14 which includes a plurality of virtual cashier terminals 12, an order-receiving center 15, a user terminal 20 as an example of a paying terminal, a synchronizing server 30 as an example of a settlement apparatus, a carrier server 40, a cashier database 50 as an example of a billing terminal database, a user database 60 as an example of a paying terminal database, and a user account database 70.

The order-receiving center 15 receives an order by telephone for mail order merchandise. At the order-receiving center 15, an operator receives an order from a user by telephone, the operator ensures the order, creates an order list using an order receiving management means of the order-receiving center 15. The order-receiving center 15 retrieves identifying information of the user terminal 20, such as a calling telephone number of the user terminal 20. When the user terminal 20 is set a calling number delivery service, the receiver may detect the calling telephone number. When the user terminal 20 does not set the calling number delivery service, the receiver can not detect the calling telephone number. In such a case, the operator asks the user his or her calling telephone number.

The order-receiving center 15, using a communicating means 19, transmits the calling telephone number of the user terminal 20 and the order list to the cashier server 14, and activates the virtual cashier terminal 12 to bill the transaction. The communicating means 19 may be either a commercial telephone line or a private line. A LAN may be used for connecting the order-receiving center 15 with the cashier server 14.

The other components marked the same as in FIG. 1 will not be described here because these components have the same action and construction as the first embodiment.

Figure 25:
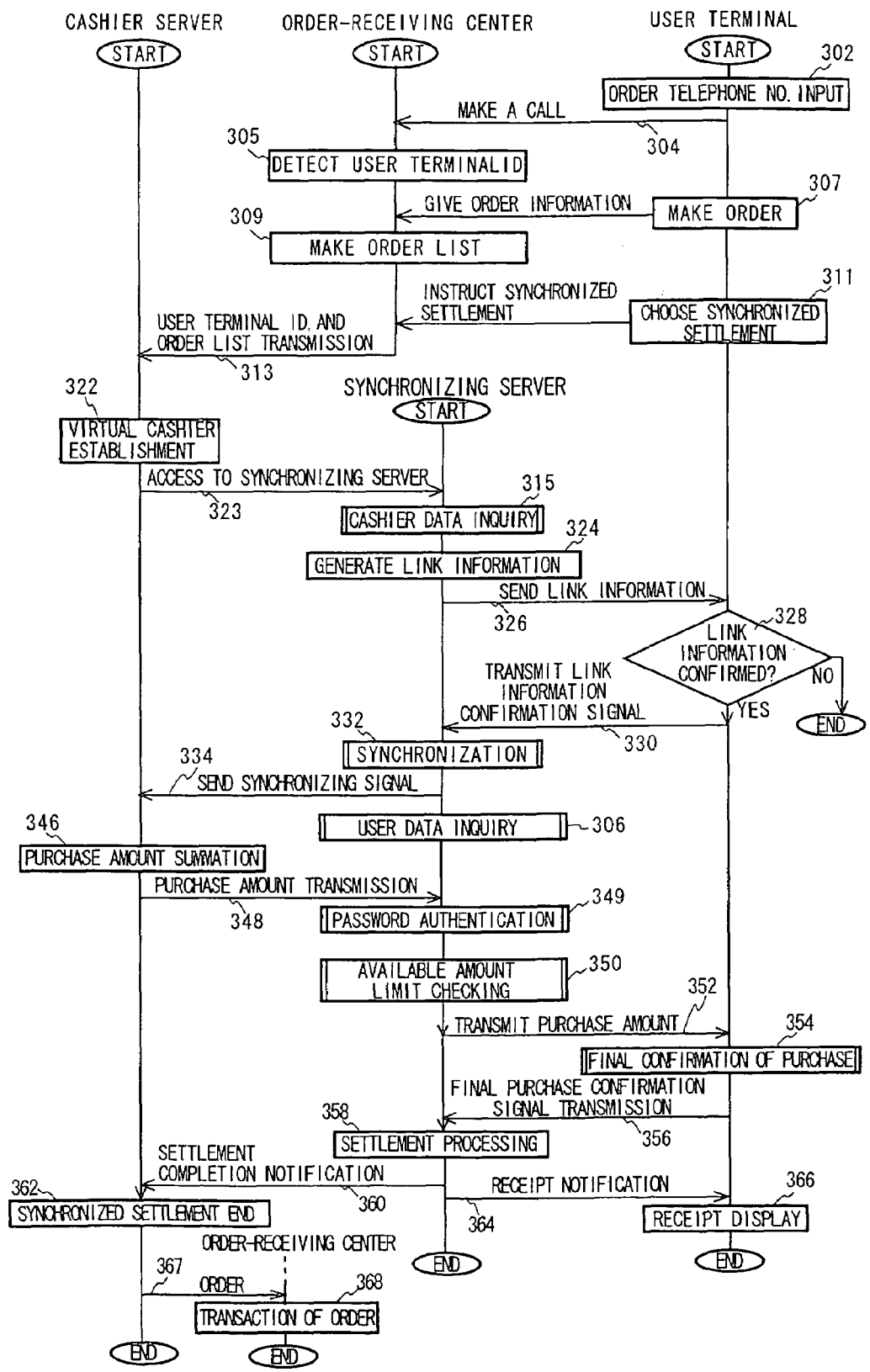
FIG. 25 is a flow chart showing an electronic settlement system processing according to the fourth embodiment.

FIG. 25 is a flow chart showing the settlement processing applying the electronic settlement system of the present embodiment. The user inputs "ordering telephone number" listed in an advertisement of a mail order or a catalog (302), and makes a telephone call to the order-receiving center 15 (304). The order-receiving center 15 retrieves the calling telephone number of the user terminal 20 as an identifying information of the user terminal 20. The user, talking to the operator of the order-receiving center 15, orders an item (307). The operator inputs the order using an order receiving management means of the order-receiving center 15, and creates an order list (309). The operator confirms the order to the user, tells a purchase amount, and asks a settlement method. When the user chooses electronic synchronizing settlement (311), the order-receiving center 15 transmits to the cashier server 14 the calling telephone number of the user terminal 20 and the order list, and activates the virtual cashier terminal 12 which performs the billing of the transaction (313). The operator of the order-receiving center 15 directs the user to hang up and wait for delivery of a message of the synchronizing settlement, and then hang up the telephone.

The cashier server 14 activates the virtual cashier terminal 12 (322). The virtual cashier terminal 12 is an apparatus or a processing performing as a cashier, may be a terminal device provided in the cashier server, or may be a program activated in the cashier server. The virtual cashier terminal 12 is connected to the synchronizing server 30, and transmits identifying information of the cashier server 14 (323).

The synchronizing server 30 makes an inquiry to the cashier data based on the identifying information of the cashier server 14 transmitted from the virtual cashier terminal 12 (315). Because the processing of the cashier data inquiry 315 is the same as the processing of the cashier data inquiry 206 in the first embodiment, the processing is not described here.

The synchronizing server 30 creates "link information" in order to identify a transaction to the virtual cashier terminal 12 (324). The link information includes cashier terminal identifying information to identify the virtual cashier terminal 12 connected to the synchronizing server 30 and cashier identifying information that identifies a cashier server 14 such as a name of a mail order retailer or a welcome message. The cashier terminal identifying information is an example of a transaction identifying number, and identifies a transaction between the user terminal 20 and the virtual cashier terminal 12. The synchronizing server 30 synchronizes the communication to the user terminal 20 with the communication to the virtual cashier terminal 12 based on the link information, and performs the settlement processing.

The synchronizing server 30 sends the link information to the user terminal 20 (326). The user terminal 20 receives the link information from the synchronizing server 30, and displays a welcome message on the screen as shown in FIG. 13(f) of the first embodiment. The user, looking at the information, confirms whether the present site is the site he or she has wanted to connect to (328). When the user chooses the "link" on the display, the user terminal 20 transmits link information confirming the signal is transmitted to the synchronizing server 30 (330). The link information confirming signal includes the cashier terminal confirming signal which is included in the link information in order to identify the virtual cashier terminal 12.

The user, choosing "cancel" on the display, may cancel the synchronized settlement. This cancellation processing is performed in such a case that the user inputs an incorrect transaction ID so that an unwanted mail order site is displayed and so on.

The synchronizing server 30, receiving the link information confirming signal from the user terminal 20 and establishes synchronization (332).

The synchronization processing 332 will not be described here hence the processing are the same as the first embodiment. When the synchronization is established, the synchronizing server 30 transmits a synchronization signal to the virtual cashier terminal 12 (334). The virtual cashier terminal 12, receiving the synchronization signal, calculates a purchase amount based on the order list received from the order-receiving center 15 (346), and transmits the purchase amount information including the order and the purchase amount to the synchronizing server 30 (348). The synchronizing server 30 performs the password authentication (349). Because the processing of the password authentication 349 is the same as the processing of the password authentication 210 in the first embodiment, the processing is not described here.

The password authentication 349 performed by the synchronizing server 30 is based on the authentication method appointed by the cashier server 14 in the processing of the cashier data inquiry 315. The cashier server 14 may appoint the authentication method as the password authentication is performed when the purchase amount exceeds a predetermined limit. In the other case, the user may appoint an authentication method. For example, the authentication method to perform the password authentication is previously appointed in the user database 60, in order to prevent improper use in such a case that the user terminal 20 is stolen. The synchronizing server 30 may retrieve the authentication method the user appointed from the user database 60 in the processing of the user data inquiry 306, may be combined with the authentication method appointed by the cashier server 14, and may decide the authentication method.

After the password authentication processing 349, the processing from the available amount checking 350 to the completion of the settlement are the same as the processing of the first embodiment, therefore the processing is not described here. The virtual cashier terminal 12 receives a settlement completion notification from the synchronizing server 30 (360), and transmits an ordering direction to the order-receiving center 15 (367). The order-receiving center, receiving the order, performs a transaction of order to a shipping center (368). The order received from the virtual cashier terminal 12 includes the calling telephone number as an identifying number to identify the user terminal 20, and the order-receiving center 15 may specify the order received form the user terminal 20 based on the calling telephone number.

The order-receiving center 15 may answer another user after transmitting the order to the virtual cashier terminal 12 in the processing 313. The order-receiving center 15 may specify the order, replace the order list to an item list in the order, and direct to the shipping center at the point of the processing 367, when the order is received from the virtual cashier terminal 12.

In the above described embodiment, the calling telephone number is used for identifying information of the user terminal 20. In another case, the synchronizing server 30 sends the link information based on the calling telephone number of the user terminal 20. An e-mail address of the user may replace the calling telephone number, and the link information is transmitted to the user terminal 20 by e-mail.

Applying the electronic settlement system of the present embodiment, the user does not need to input the transaction ID to identify the cashier server 14 to merchandise the mail order. The order may be performed by a telephone call to the order-receiving center of the mail order retailer in a dialog with the order receiving operator. The user does not need to input the ordering information about the item from the user terminal 20. Therefore, the user may order and settle the mail order transaction simply and easily. Especially, when the user uses a cellular phone for the user terminal 20, telephone communication is easier than the input of letters and numbers. Therefore convenience of the system is improved.

A modification of the present embodiment is described as follows. The electronic settlement system described above may be applied to a settlement over the counter in a store. After a clerk finishes an accounting procedure for a purchase by a customer at a cashier terminal, the clerk inquires the calling telephone number of the user terminal 20 or an e-mail address of the customer, and inputs to the cashier terminal. The cashier terminal transmits the calling telephone number of the user terminal 20 or the e-mail address of the customer to the synchronizing server 30. The synchronizing server 30 sends the link information to the user terminal 20 based on the calling telephone number of the user terminal 20 or the e-mail address of the customer received from the cashier terminal. The link information includes cashier information of the cashier of the store. The user may confirm the cashier by the link information displayed on the user terminal 20. The user terminal 20 transmits a link information confirmation signal to the synchronizing server 30. The synchronizing server 30 establishes synchronization of the communication with the cashier in the store. Thus, the electronic settlement is the same as the electronic settlement system described above and may be performed between the user terminal 20 and the cashier terminal in the store.

In the above described modification, instead of the customer giving the calling telephone number of the user terminal 20 or the e-mail address of the customer, the user terminal 20 may transmit the calling telephone number of the user terminal 20 or the e-mail address of the customer using a light communication such as an infrared communication or a short range wireless communication. In another case, the user terminal 20 may display the calling telephone number of the user terminal 20 or the e-mail address of the customer on the display in the form of a pattern code such as a barcode or a cyber code which is a two dimension bar code. The customer allows a pattern code reader provided in the cashier terminal to read a pattern code displayed on the user terminal 20, and sends the calling telephone number of the user terminal 20 or the e-mail address of the customer.

(Fifth Embodiment)

Figure 26:
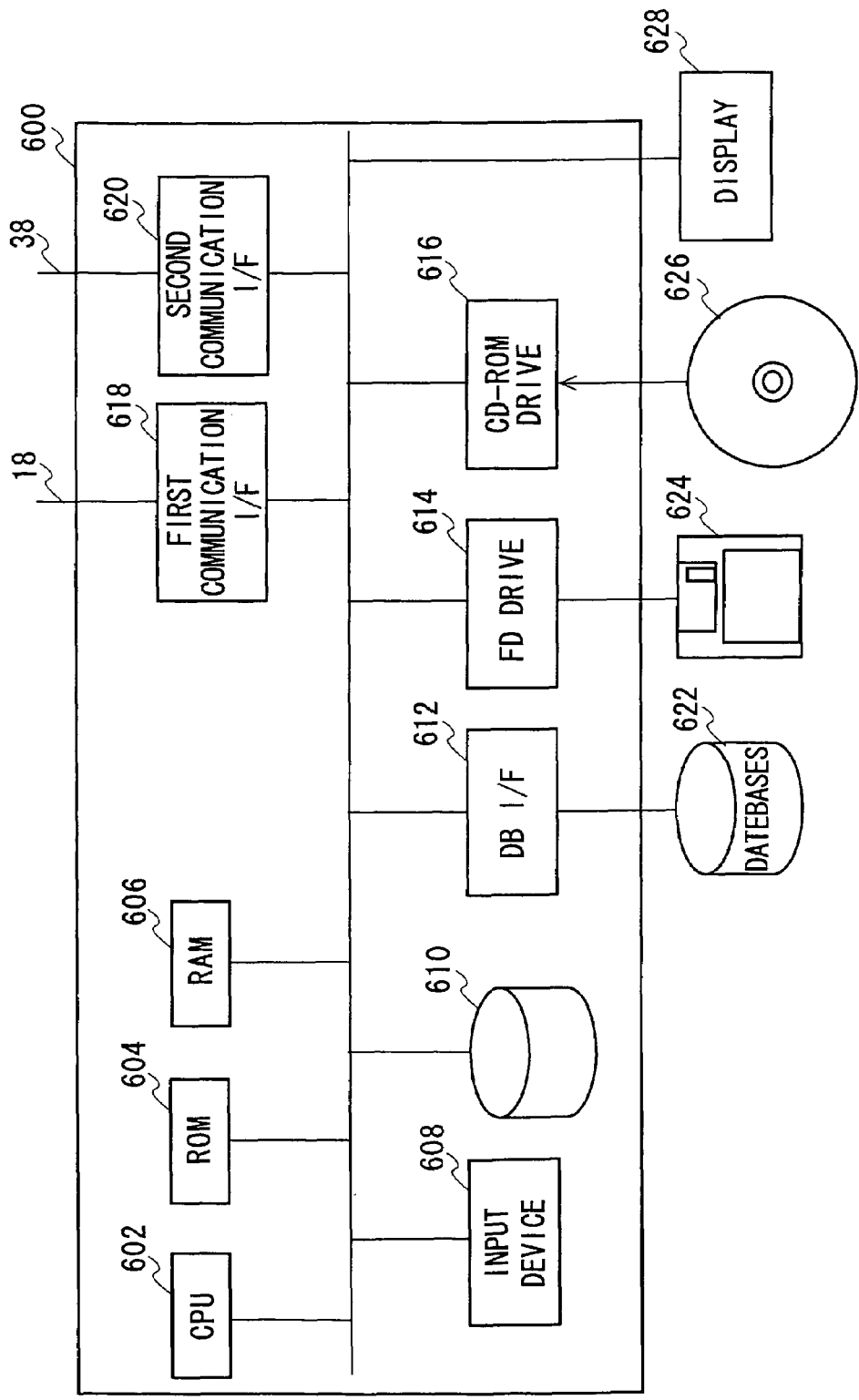
FIG. 26 is a schematic diagram showing a configuration of hardware architecture of a general-purpose computer 600.

The synchronizing server 30 as an example of the settlement apparatus in the electronic settlement system according to the first, second, third, and fourth embodiments may be realized using a general-purpose computer. FIG. 26 is a block diagram showing a hardware configuration of a general-purpose computer 600. As shown in FIG. 26, a CPU 602 of the computer 600 is operated based on the programs stored in a ROM 604 and a RAM 606. Using an input device 608, an administrator of the synchronizing server 30 may input data or commands. Setting information and programs to operate the CPU 602 are stored in a hard disk drive 610 as an example of a storing device.

A floppy disk drive 614 reads data or programs from a floppy disk 624 and provides this to the CPU 602. A CD-ROM drive 616 reads data or programs from a CD-ROM 626 and provides this to the CPU 602. A first communication interface 618 connects to a transmission line 18 and communicates data. A second communication interface 620 connects to a transmission line 38 and communicates data. A database interface 612 connects to databases 622 and communicates data with the database. Furthermore, the synchronizing server 30 has an interface to connect with a display 628 so that the administrator may watch an operational status of the synchronizing server 30, or check the setting information using the display 628.

Figure 27:
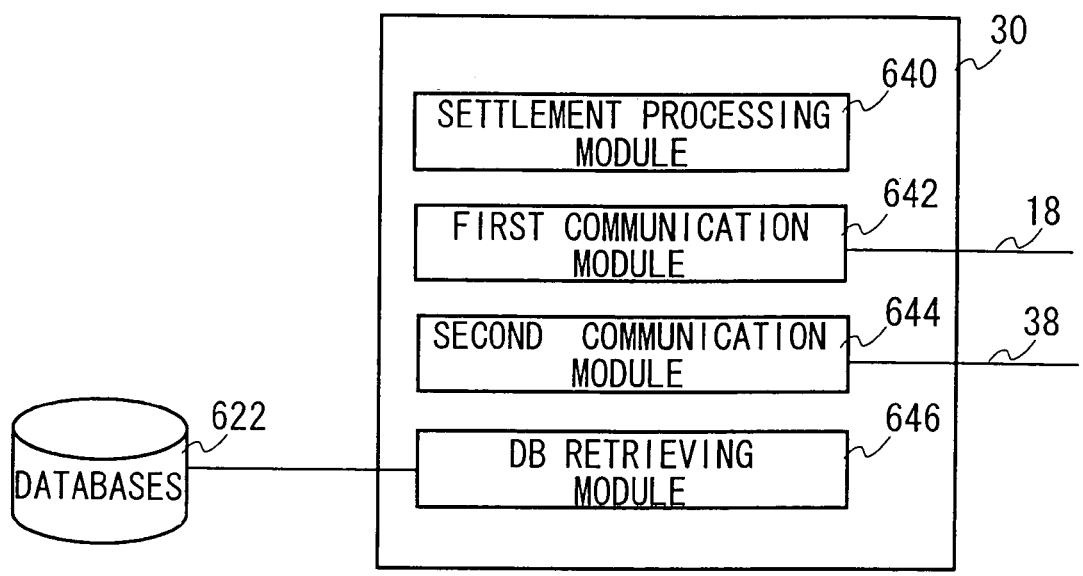
FIG. 27 is a schematic diagram showing a configuration of a functional architecture of software executed on a CPU 602.

FIG. 27 is a block diagram showing a functional configuration of the software operating the CPU 602 shown in FIG. 26. This software is provided to users stored in a recording media such as a floppy disk 624 or a CD-ROM 626 and soon. The software stored in the recording media may be compressed or non-compressed. The software is installed from the recording media to the hard disk drive 610, read out to the RAM 606, and executed by the CPU 602.

The software stored in the recording media to be provided, that is the software installed in the hard disk drive 610, has a settlement processing module 640, a first communication module 642, a second communication module 644, and a database retrieving module 646, for its functional configuration.

The processing, performed by the CPU 602 operating the computer 600, of the settlement processing module 640, the first communication module 642, the second communication module 644, and the database retrieve module 646, are the same as each of the settlement processing unit 80, the first communication unit 82, the second communication unit 84, and the database retrieving unit 86 in the synchronizing server 30 according to the first, second, third and fourth embodiment; therefore these processing will not be described here.

The floppy disk 624 or CD-ROM 626 shown in FIG. 26, as an example of the recording media, may store a part of or all of the function for the operation of the synchronizing server 30 as an example of the settlement apparatus applying the entire embodiment described in the present application. Furthermore, the synchronizing server 30 may replace a part of the operation of the cashier server 14 and the synchronizing server 30 may operate a part of the operation of the cashier server 14 of the above described embodiment. In such case, the part of the operation of the cashier server 14 described in the above embodiment may be stored in the floppy disk 624 or the CD-ROM 626.

These programs may be read to RAM directly from the recording media and executed, or be installed to the hard disk drive once, then read to RAM and executed. Furthermore, these above described programs may be stored in a single recording medium or a plurality of recording media. In other cases, these programs may be stored in an encoded form.

Besides a floppy disk and a CD-ROM, an optical recording media such as a DVD, a magnetic recording media such as an MD, a magnetic optical recording media such as a PD, a tape device, and a semiconductor memory such as an IC card or miniature card and so on may be used for a recording media. In other cases, using a store device such as a hard disk or a RAM provided in a server system for a recording media, connected to a private telecommunication network or an Internet, the programs may be provided to the synchronizing server 30 via a communication network. Such recording media are used only for manufacturing the synchronizing server 30, so that it is obvious that manufacturing and distribution of such recording media as vocation constructs infringement of a patent based on the present application.

In the first, second, third, and fourth embodiments described above, the transmission line 18 connecting the cashier server 14 with the synchronizing server 30 may be a wireless communication or an Internet, other than a commercial telephone line or a private line. When the transmission line 18 is the Internet, in order to ensure security of the data communication to the synchronizing server 30, it is desirable to choose a high security communication method.

In another case, a bit filtering means is provided on a communication pathway between the carrier server 40 and the synchronizing server 30 and/or a pathway between the cashier server 14 and the synchronizing server 30. The bit filtering means may detect data format or bit pattern of data sent between the user terminal 20 or the cashier server 14 and the synchronizing server 30. Applying the present invention, because confidential information such as personal information of user is not sent between the synchronizing server 30 and the user terminal 20 or the cashier server 14 so that the data does not need to be encrypted. Thus, the bit filtering means may observe the data format and the bit pattern of the communicated data and find an unexpected access pattern easily. Therefore, false access to the electronic settlement system or destroying access may be stopped.

As described above, according to the electronic settlement system of the first embodiment, the user, who read a mail order advertisement in a newspaper, a magazine, a mail order catalog and so on, may order items and execute settlement electronically. The user also may confirm if the connected site is the correct mail order site he or she wanted by a link information displayed on information in his or her portable terminal before confirming his or her order. The retailer of the mail order, by appointing the authentication method, may settle after authentication of the user by a password and so on.

According to the electronic settlement system of the second embodiment, the electronic settlement is performed after the user is authenticated with his or her voice. Thus, high accuracy authentication is ensured.

According to the electronic settlement system of the third embodiment, authentication of the user is performed by letting the user to transmit identifying information image data of the user as an individual such as a facial portrait, an iris, a retina, or a finger print of the user, security of the electronic settlement is ensured. Applying image authentication, which differs from the voice authentication, using a data packet of communication facility attached to the cellular phone, a cellular phone does not need to be connected to the voice carrier, so that the authentication and the settlement may be performed successfully.

According to the electronic settlement system of the fourth embodiment, the user does not need to input a transaction ID to identify the cashier server 14 which performs the mail order merchandise, the order of an item may be performed by making a telephone call to the mail order-receiving center, and verbally explained to a order-receiving operator. The user does not need to input ordering information of the item from the user terminal 20, and ordering and settling the mail order is convenient.

The electronic settlement system of the present invention has the following advantages for the mail order retailer. Based on the uniqueness of the calling telephone number of a cellular phone, a secure user authentication may be ensured. On the other hand, because the system has a selection of authentication methods, the accuracy of the authentication may be easily varied corresponding to a settlement amount or a situation of the settlement.

The electronic settlement system of the present invention has the following advantage for users. Carrying a cellular phone, which is a communication terminal with a very good portability, a transaction may be electronically settled anytime and anywhere; therefore the user does not need to carry cash, a credit card, a bank card, or an IC money card and so on. Furthermore, the user, using a data packet communication facility of the cellular phone, may check if the payment is withdrawn from his or her account, his or her available amount, his or her purchase history, and so on.

The electronic settlement system of the present invention has the following advantage for a credit card company. Applying the authentication method using a cellular phone may discourage a false use of stolen cards. Because a credit settlement may be performed electronically using a cellular phone, issuing a credit card or management of a credit card is no longer needed; costs may be reduced. Furthermore, using a combination authentication method, in a case that a person responsible in the credit card company and so on moved data falsely, settlement accounts of users may be protected from false use.

Although the present invention has been described by way of exemplary embodiments, it should be understood that many changes and substitutions may be side by those skilled in the art without departing from the spirit and the scope of the present invention which is defined only by the appended claims.

INDUSTRIAL APPLICABILITY

It is obvious from the above description, according to the present invention, a settlement of a commercial transaction may be performed safely and conveniently via a telecommunication network.

What is claimed is:

1. An electronic system for setting up an authentication through a communication network, comprising:
   a personal terminal which is operated for participating in the authentication, said personal terminal being connectable to the communication network and including an information indicating unit and an input unit for inputting an indication;
   a virtual terminal which is connectable to the communication network for participating in the authentication with said personal terminal; and
   a synchronizing server communicating with said personal terminal and with said virtual terminal, said synchronizing server activating the virtual terminal and setting up link information including authentication ID information in association with said virtual terminal and transmits said links information to said personal terminal upon receipt by said synchronizing server of information regarding the authentication, and said synchronizing server establishing a synchronization of communication between said personal terminal and said virtual terminal one-to-one upon receipt of both the same authentication ID information and the indication in response to the link information indicated on the indicating unit from said personal terminal,
   wherein said personal and virtual terminals send and receive messages in real time via the synchronizing server during the synchronization, and the synchronizing server initiates the virtual terminal after the communication.

2. An electronic system as claimed in claim 1, further comprising a cashier server connected to said synchronizing server via the communicating network, said cashier server generating said virtual terminal.

3. An electronic system as claimed in claim 1, wherein said personal terminal comprises at least one of a cellular phase, a PDA and a notebook type personal computer; and the information regarding the authentication comprises personal terminal information including at least one of a telephone number and an e-mail address of said personal terminal.

4. An electronic system as claimed in claim 1, further comprising:
   a personal terminal database for storing personal terminal information including at least one of a telephone number and an e-mail address of the personal terminal; and
   a virtual terminal database for storing virtual terminal information including at least information for identifying said virtual terminal, which information being indicated on said information indicating unit of said personal terminal;
   wherein said synchronizing server identifies said personal terminal based on the information regarding the authentication transmitted from said personal terminal and the personal terminal information stored in said personal terminal database and transmits the virtual terminal information as a part of the link information to said personal terminal.

5. An electronic system as claimed in claim 4, wherein said synchronizing server transmits the virtual terminal information with an internet address to said personal terminal.

6. An electronic system as claimed in claim 4, wherein the virtual terminal information includes information relating to an item for the authentication.

7. An electronic system as claimed in claim 1, wherein the information regarding the authentication includes a number listed in at least one of a mail order advertisement and a catalog distributed to a user of said personal terminal in advance.

8. The electronic system according to claim 1, wherein the synchronizing server receives the information regarding the authentication via the virtual terminal.

9. The electronic system according to claim 1, wherein the synchronizing server receives the information regarding the authentication inputted by the input unit of the personal terminal.

10. The electronic system according to claim 1, wherein a the indication inputted by the input unit includes a confirmation indicating establishment of the synchronization.

11. An electronic server system for setting up an authentication through a communication network, which effects communication of a virtual terminal for participating in the authentication with a personal terminal including an information indicating unit and an input unit for inputting an indication, comprising,
   a communicating section connected to the communication network; and
   a processing unit for communicating with the personal terminal and with the virtual terminal through said communicating section, said processing unit activating the virtual terminal and setting up link information including authentication ID information in association with the virtual terminal and transmitting said link information which is indicatable in the information indicating unit of the personal terminal upon receipt of information regarding the authentication, said processing unit establishing a synchronization of communication between the personal terminal and the virtual terminal one-to-one upon receipt of both the same authentication ID information transmitted to the personal terminal and the indication in response to the link information indicating on the indicating unit from the personal terminal,
   wherein said personal and virtual terminals send and receive messages in real time via the processing unit server during the synchronization, and the processing unit initiates the virtual terminal after the communication.

12. An electronic server system as claimed in claim 11, wherein said virtual terminal connects to said processing unit via a commercial telephone line or a private line, and said personal terminal connects to said processing unit via a radio telephone communication.

13. An electronic server system as claimed in claim 11, further comprising a cashier server which includes the virtual terminal, wherein said processing unit transmits the indication for generating the virtual terminal to said cashier server through said communicating section.

14. An electronic server system as claimed in claim 11, wherein the personal terminal comprises at least one of a cellular phone, a PDA and a notebook type personal computer; and the information regarding the authentication comprises personal terminal information including at least one of a telephone number and an e-mail address of the personal terminal.

15. An electronic server system as claimed in claim 11, further comprising:
- a personal terminal database for storing personal terminal information including at least one of a telephone number and an e-mail address of the personal terminal; and
- a virtual terminal database for storing virtual terminal information including at least information for identifying the virtual terminal, which information being indicated on the information indicating unit of the personal terminal;
- wherein said processing unit identifies the personal terminal based on the information regarding the authentication transmitted from the personal terminal and the personal terminal information stored in said personal terminal database and transmits the virtual terminal information as a part of the link information to the personal terminal through said communicating section.

16. An electronic server system as claimed in claim 15, wherein said processing unit transmits the virtual terminal information with an internet address to the personal terminal.

17. An electronic server system as claimed in claim 15, wherein the virtual terminal information includes information relating to an item for the authentication.

18. An electronic server system as claimed in claim 11, wherein the information regarding the authentication includes a number listed in at least one of a mail order advertisement and a catalog distributed to a user of said personal terminal in advance.

19. An electronic server system as claimed in claim 11, wherein said communicating section further comprises a first communicating unit connected to the virtual terminal via a first communicating network, and a second communicating unit connected to the personal terminal via a second communicating network.

20. The electronic server system according to claim 11, wherein the processing unit receives the information regarding the authentication via the virtual terminal.

21. The electronic servicer system according to claim 11, wherein the processing unit receives the information regarding the authentication inputted by the input unit of the personal terminal.

22. The electronic server system according to claim 11, wherein the indication inputted by the input unit includes a confirmation indicating establishment of the synchronization.

23. A recording medium which stores a program executable by a computer, for setting up an authentication through a communication network, which effects communication a virtual terminal for participating in the authentication with a personal terminal including an information indicating unit and an input unit for inputting indication, comprising:
- a communicating module which operates the computer to communicate with the virtual terminal and with the personal terminal through the communicating network, and
- a processing module for communicating with said personal terminal and with said virtual terminal through said communicating section, said processing module activating the virtual terminal and setting up link information including authentication ID information in association with said virtual terminal and transmitting said link information which is indicatable in the information indicating unit of the personal terminal upon receipt of information regarding the authentication transmitted by said personal terminal, said processing module establishing a synchronization of communication between said personal terminal and said virtual terminal one-to-one upon receipt of both the same authentication ID information transmitted to the personal terminal and the indication in response to the link information indicated on the indicating unit from said personal terminal,
- wherein said processing module controls sending and receiving of messages in real time by said personal and virtual terminals during the synchronization, and initiates the virtual terminal after the communication.

24. The recording medium according to claim 23, wherein the processing module receives the information regarding the authentication via the virtual terminal.

25. The recording medium according to claim 23, wherein the processing module receives the information regarding the authentication inputted by the input unit of the personal terminal.

26. The recording medium according to claim 23, wherein the indication inputted by the input unit includes a confirmation indicating establishment of the synchronization.

27. A electronic server system for setting up an authentication through a communication network, which communicates with a virtual terminal for participating in the authentication, a personal terminal having an information indicating unit, and an order-receiving center including an order-receiving unit for receiving the information regarding the authentication through an input unit of a communicating terminal for inputting information regarding the authentication; comprising:
- a communicating section connected to the communication network; and
- a processing unit for activating the virtual terminal and setting up a link information including authentication ID information in every authentication and transmitting the link information which is indicatable in the information indicating unit of the personal terminal, upon receipt of the information regarding the authentication transmitted by the order-receiving unit through said communicating section, said processing unit establishing a synchronization of communication between the personal terminal and the virtual terminal one-to-one upon receipt of both the same authentication ID information transmitted to the personal terminal and an indication inputted by using the input unit in response to the link information indicated on the indicating unit from the personal terminal,
- wherein said personal and virtual terminals send and receive messages in real time via the processing unit server during the synchronization and the processing unit initiates the virtual terminal after the communication.

28. An electronic server system as claimed in claim 27, wherein said communicating section connects to said virtual terminal via a commercial telephone line or a private line, and said communicating section connects to said personal terminal via radio telephone communication.

29. An electronic server system as claimed in claim 27, further comprising a cashier server which includes the virtual terminal, wherein said processing unit transmits an instruction for generating the virtual terminal to said cashier server through said communicating section.

30. An electronic server system as claimed in claim 27, wherein the personal terminal comprises at least one of a cellular phone, a PDA and a notebook type personal computer, and the information regarding the authentication comprises personal terminal information including at least one of a telephone number and an e-mail address of the personal terminal.

31. An electronic server system as claimed in claim 27, further comprising:
- a personal terminal database for storing personal terminal information including at least one of a telephone number and an e-mail address of the personal terminal; and
- a virtual terminal database for storing virtual terminal information including at least information for identifying said virtual terminal, which information being indicated on said indicating unit of the personal terminal;
- wherein said processing unit identifies the personal terminal based on the information regarding the authentication transmitted from the communicating terminal and the personal terminal information stored in said personal terminal database and transmits the virtual terminal information as a part of the link information to the personal terminal through said communicating section.

32. An electronic server system as claimed in claim 31, wherein said processing unit transmits the virtual terminal information with an internet address to the personal terminal.

33. An electronic server system as claimed in claim 31, wherein the virtual terminal information includes information relating to an item for the authentication.

34. An electronic server system as claimed in claim 27, wherein the information regarding the authentication includes a number listed in at least one of a mail order advertisement and a catalog distributed to a user of said personal terminal in advance.

35. An electronic server system as claimed in claim 34, wherein said communicating section is connectable to the order-receiving center through a communicating line.

36. An electronic server system as claimed in claim 27, wherein said communicating section comprises:
- a first communicating unit connected to the virtual terminal via a first communicating network; and
- a second communicating unit connected to the personal terminal via a second communicating network.

37. An electronic server system as claimed in claim 27, wherein the personal terminal includes a phone and said communicating section receives information relating to the information regarding the authentication inputted from the input unit of said personal terminal with voice into the order-receiving unit.

38. An electronic server system as claimed in claim 27, wherein
- the personal terminal comprises at least one of a cellular phone, a PDA and a notebook type personal computer; and
- the communicating section is connectable to the order-receiving center through a communicating line comprising at least one of a telephone line, a private line and a LAN.

39. The electronic server system according to claim 27, wherein the processing unit receives the information regarding the authentication via the virtual terminal.

40. The electronic server system according to claim 27, wherein the processing unit receives the information regarding the authentication inputted by the input unit of the communicating terminal.

41. The electronic server system according to claim 27, wherein the indication inputted by the input unit includes a confirmation indicating establishment of the synchronization.

42. A recording medium which stores a program executable by a computer, for setting up an authentication through a communication network, which effects communication with a virtual terminal for participating in the authentication, a personal terminal having an information indicating unit, and an order-receiving center including an order-receiving unit for receiving the information regarding the authentication through an input unit of a communicating terminal for inputting information regarding the authentication: comprising;
- a communicating module which operates the computer to communicate with the virtual terminal and with the personal terminal through the communicating network; and
- a processing module for activating the virtual terminal and setting up a link information including authentication ID information in every authentication and transmitting the link information which is indicatable in the information indicating unit of the personal terminal upon receipt of the information regarding the authentication transmitted by the order-receiving unit through the communicating section, said processing module establishing a synchronization of communication between the personal terminal and the virtual terminal one-to-one upon receipt of both the same authentication ID information transmitted to the personal terminal and an indication inputted by using the input unit in response to the link information indicated on the indicating unit from the personal terminal,
- wherein said processing module controls sending and receiving of real time messages by said personal and virtual terminals during the synchronization and initiating the virtual terminal after the communication.

43. The recording medium according to claim 42, wherein the processing module receives the information regarding the authentication via the virtual terminal.

44. The recording medium according to claim 42, wherein the processing module receives the information regarding the authentication inputted by the input unit of the communicating terminal.

45. The recording medium according to claim 42, wherein the indication inputted by the input unit includes a confirmation indicating establishment of the synchronization.

* * * * *